United States Patent
Jeong et al.

(10) Patent No.: US 9,787,998 B2
(45) Date of Patent: Oct. 10, 2017

(54) VIDEO ENCODING CIRCUIT AND VIDEO ENCODING METHOD USING THE SAME, AND OPERATION PROCESSING DEVICE

(71) Applicant: Samsung Electronics Co., Ltd., Suwon-si (KR)

(72) Inventors: Yowon Jeong, Anyang-si (KR); Nyeong-Kyu Kwon, Daejeon (KR); Seungha Yang, Suwon-si (KR); Kwanghyun Won, Suwon-si (KR); Byeungwoo Jeon, Suwon-si (KR)

(73) Assignees: Samsung Electronics Co., Ltd. (KR); RESEARCH & BUSINESS FOUNDATION, SUNGKYUNKWAN UNIVERSITY (KR)

( * ) Notice: Subject to any disclaimer, the term of this patent is extended or adjusted under 35 U.S.C. 154(b) by 172 days.

(21) Appl. No.: 14/636,482

(22) Filed: Mar. 3, 2015

(65) Prior Publication Data

US 2016/0029039 A1  Jan. 28, 2016

(30) Foreign Application Priority Data

Jul. 22, 2014 (KR) ........................ 10-2014-0092774

(51) Int. Cl.
*H04N 19/51* (2014.01)
*H04N 19/172* (2014.01)
(Continued)

(52) U.S. Cl.
CPC ........... *H04N 19/182* (2014.11); *H04N 19/12* (2014.11); *H04N 19/134* (2014.11); *H04N 19/136* (2014.11); *H04N 19/176* (2014.11)

(58) Field of Classification Search
None
See application file for complete search history.

(56) References Cited

U.S. PATENT DOCUMENTS 7,545,988 B2 * 6/2009 Meeker .................. H04N 19/63
382/232
7,751,631 B2    7/2010 Youn et al.
(Continued)

FOREIGN PATENT DOCUMENTS

KR    100744435    7/2007
KR    101305093    9/2013

OTHER PUBLICATIONS

Yang, et al. "Transform Skip Mode Fast Decision Method for HEVC Encoding", The Journal of Korea Information and Communications Society '14-04 vol. 39A No. 4 pp. 172-179.

*Primary Examiner* — Mohammad J Rahman
(74) *Attorney, Agent, or Firm* — Onello & Mello, LLP.

(57) ABSTRACT

A transform processor may process original data that includes video information by using at least one of first and second processing methods, and generates at least one of first and second transformed data. Index determination logic may determine an index satisfying a determination condition based on at least one of the first and second transformed data. Energy compaction determination logic may determine energy compaction of at least one of the first and second transformed data based on the determined index. Output selection logic may selectively output one of the first and second transformed data based on the determined energy compaction. An entropy encoder may encode data output from the output selection logic.

20 Claims, 16 Drawing Sheets

(51) Int. Cl.
*H04N 19/176* (2014.01)
*H04N 19/182* (2014.01)
*H04N 19/91* (2014.01)
*H04N 19/124* (2014.01)
*H04N 19/134* (2014.01)
*H04N 19/12* (2014.01)
*H04N 19/136* (2014.01)

(56) References Cited

U.S. PATENT DOCUMENTS

| | | | |
|---|---|---|---|
| 8,045,612 B1 * | 10/2011 | Bao | H04N 19/61 |
| | | | 375/240.01 |
| 8,077,769 B2 | 12/2011 | Krishnan | |
| 8,086,053 B2 * | 12/2011 | Kim | H04N 19/50 |
| | | | 382/232 |
| 8,165,195 B2 | 4/2012 | Song | |
| 8,243,813 B2 | 8/2012 | Hatabu | |
| 8,885,701 B2 | 11/2014 | Saxena et al. | |
| 2001/0026642 A1 | 10/2001 | Kang et al. | |
| 2001/0033139 A1 * | 10/2001 | Wu | G06T 9/007 |
| | | | 315/1 |
| 2003/0197898 A1 * | 10/2003 | Battiato | H04N 19/172 |
| | | | 358/302 |
| 2008/0049854 A1 * | 2/2008 | Kim | H04N 19/50 |
| | | | 375/260 |
| 2011/0150072 A1 | 6/2011 | Han | |
| 2011/0200106 A1 * | 8/2011 | Park | H04N 21/234327 |
| | | | 375/240.15 |
| 2012/0140822 A1 * | 6/2012 | Wang | H04N 19/197 |
| | | | 375/240.12 |
| 2013/0114730 A1 | 5/2013 | Joshi et al. | |
| 2013/0170761 A1 * | 7/2013 | Wey | G06K 9/36 |
| | | | 382/225 |
| 2013/0230097 A1 * | 9/2013 | Sole Rojals | H04N 19/13 |
| | | | 375/240.02 |
| 2013/0301704 A1 * | 11/2013 | Srinivasan | H04N 19/136 |
| | | | 375/240.02 |
| 2013/0343464 A1 | 12/2013 | Van der Auwera et al. | |
| 2015/0215574 A1 * | 7/2015 | Hinds | H04N 19/60 |
| | | | 348/441 |
| 2016/0100195 A1 * | 4/2016 | Smith | H04N 19/176 |
| | | | 375/240.19 |

* cited by examiner

VIDEO ENCODING CIRCUIT AND VIDEO ENCODING METHOD USING THE SAME, AND OPERATION PROCESSING DEVICE

CROSS-REFERENCE TO RELATED APPLICATIONS

The present application claims priority under 35 U.S.C. §119 to Korean Patent Application No. 10-2014-0092774, filed on Jul. 22, 2014, the entire contents of which are incorporated herein by reference.

BACKGROUND

1. Technical Field

Inventive concepts relate to image processing, and more particularly, to a circuit and a method for encoding data including video information.

2. Related Art

Various image processing methods may be used to display an image on an electronic device. For example, an image processing method for improving image quality, for transforming an image format, or for identifying a specific property in an image may be used.

In particular, higher resolution images, which provide improved viewing experiences, require greater storage capacity and transmission speed and, as a result, image processing methods for compressing image data are employed for both storage and transmission of image data. Image data may be compressed, for example, by transforming and encoding. After storage and/or transmission, image data may then be recovered by reverse-transforming and decoding of the compressed data.

SUMMARY

Exemplary embodiments in accordance with principles of inventive concepts include a video encoding circuit including a transform processor configured to receive original data comprising video information, to process the received original data by using at least one of first and second processing methods, and to generate at least one of first and second transformed data. Each of the first and second transformed data comprises coefficients having indexes respectively assigned according to a scan order. The video encoding circuit may also include index determination logic configured to determine an index satisfying a determination condition among the indexes respectively assigned to the coefficients, based on at least one of the first transformed data generated by the first processing method and the second transformed data generated by the second processing method. The video encoding circuit may further include energy compaction determination logic configured to determine energy compaction of at least one of the first and second transformed data, based on the determined index. Moreover, the video encoding circuit may include output selection logic configured to selectively output one of the first and second transformed data, based on the determined energy compaction, and include an entropy encoder configured to encode data output from the output selection logic to generate encoded data.

Exemplary embodiments in accordance with principles of inventive concepts include a video encoding method using a video encoding circuit. The video encoding method may include receiving original data comprising video information, generating at least one of first and second transformed data by processing the received original data with at least one of first and second processing methods, each of the first and second transformed data comprising coefficients having indexes respectively assigned according to a scan order, determining an index satisfying a determination condition among the indexes respectively assigned to the coefficients based on at least one of the first transformed data generated by the first processing method and the second transformed data generated by the second processing method, determining energy compaction of at least one of the first and second transformed data based on the determined index, and selectively encoding one of the first and second transformed data based on the determined energy compaction.

Exemplary embodiments in accordance with principles of inventive concepts include an electronic device including a video encoder. The video encoder may include a transform and quantization processor configured to receive residual data included in transform unit and comprising residual information, to process the received residual data by using at least one of first and second processing methods, and to generate at least one of first and second transformed data. Each of the first and second transformed data comprises coefficients having indexes respectively assigned according to a scan order. The video encoder may also include index determination logic configured to determine an index satisfying a determination condition among the indexes respectively assigned to the coefficients, based on the first transformed data generated by the first processing method and the second transformed data generated by the second processing method. The video encoder may further include energy compaction determination logic configured to determine energy compaction of at least one of the first and second transformed data, based on the determined index. Moreover, the video encoder may include output selection logic configured to selectively output one of the first and second transformed data, based on the determined energy compaction, and may include an entropy encoder configured to encode data output from the output selection logic to generate encoded data.

Exemplary embodiments in accordance with principles of inventive concepts may further include a video encoding circuit for encoding a pixel block, including a first circuit to transform input video data into frequency domain data and to quantize the frequency domain data; a second circuit to quantize the input video data; an energy compaction determination circuit to determine which circuit yields a more highly energy-compacted quantized data; and an encoding circuit to encode the more highly energy-compacted quantized data.

In some embodiments, the quantized data includes coefficients that are indexed according to a scan order. In some embodiments, coefficients having non-zero values have energy and the index of the last coefficient having energy is a terminal index. In some embodiments, the circuit having the more highly energy-compacted quantized data corresponds to the one with the lowest terminal index value. In some embodiments, the circuit further includes image type information in encoding selection.

Exemplary embodiments in accordance with principles of inventive concepts may further include a video encoding circuit having an image encoder/decoder including a video encoding circuit for encoding a pixel block, including a first circuit to transform input video data into frequency domain data and to quantize the frequency domain data; a second circuit to quantize the input video data; an energy compaction determination circuit to determine which circuit yields a more highly energy-compacted quantized data; and an encoding circuit to encode the more highly energy-compacted quantized data.

Exemplary embodiments in accordance with principles of inventive concepts may further include a portable electronic device including a video encoding circuit having an image encoder/decoder including a video encoding circuit for encoding a pixel block, including a first circuit to transform input video data into frequency domain data and to quantize the frequency domain data; a second circuit to quantize the input video data; an energy compaction determination circuit to determine which circuit yields a more highly energy-compacted quantized data; and an encoding circuit to encode the more highly energy-compacted quantized data.

BRIEF DESCRIPTION OF THE DRAWINGS

The above and other aspects, features, and advantages of exemplary embodiments of inventive concepts will become apparent from the following detailed description with reference to the following figures, wherein like reference numerals refer to like parts throughout the various figures unless otherwise specified.

DETAILED DESCRIPTION OF EMBODIMENTS

Figure 1:
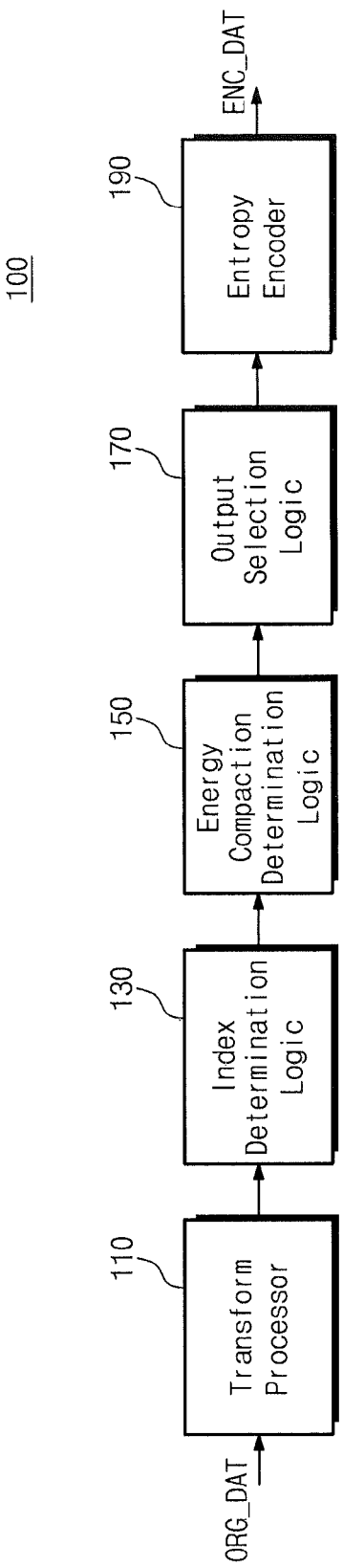
FIG. 1 is a block diagram illustrating a video encoding circuit in accordance with principles of inventive concepts.

Various exemplary embodiments will be described more fully hereinafter with reference to the accompanying drawings, in which some exemplary embodiments are shown. Inventive concepts may, however, be embodied in many different forms and should not be construed as limited to the exemplary embodiments set forth herein. Rather, these exemplary embodiments are provided so that this description will be thorough and complete, and will convey the scope of inventive concepts to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items and the term "or" is meant to be inclusive, unless otherwise indicated.

It will be understood that, although the terms first, second, third, fourth etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of inventive concepts. The thickness of layers may be exaggerated for clarity.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of inventive concepts. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments are described herein with reference to cross-sectional illustrations that are schematic illustrations of idealized exemplary embodiments (and intermediate structures). As such, variations from the shapes of the illustrations as a result, for example, of manufacturing techniques and/or tolerances, are to be expected. Thus, exemplary embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of inventive concepts.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating an exemplary embodiment of a video encoding circuit 100 in accordance with principles of inventive concepts. The video encoding circuit 100 may include a transform processor 110, index determination logic 130, energy compaction determination logic 150, output selection logic 170, and an entropy encoder 190.

The transform processor 110 may receive original data ORG_DAT. The original data ORG_DAT may include video information, which may form an image by pixel unit and frame unit, for example. The transform processor 110 may process the original data ORG_DAT using at least one of a first processing method and a second processing method. The transform processor 110 may process the original data ORG_DAT to generate at least one of first transformed data and second transformed data, with the first transformed data generated by the first processing method, and the second transformed data generated by the second processing method.

In an exemplary embodiment, when the video encoding circuit 100 operates according to a high efficiency video coding (HEVC) standard published as H.265, the first processing method may be performed by transforming the original data ORG_DAT into frequency domain data and quantizing the frequency domain data. The second processing method may be performed by quantizing the original data ORG_DAT without transformation. In such exemplary embodiments, the transforming may be performed by a discrete cosine transform (DCT), a discrete sine transform (DST), an integer transform, or a transform similar to the above transforms, for example. Additionally, the first transformed data and the second transformed data may include a plurality of coefficient information, also referred to herein, simply, as "coefficients." Each of the coefficients may have an index assigned according to a scan order. Exemplary embodiments of scan order and indexes will be described in greater detail in the discussion related to FIG. 2, for example.

In exemplary embodiments in accordance with principles of inventive concepts, the first transformed data and the second transformed data may be exchanged. Alternatively, the first transformed data and the second transformed data may be generated by other processes. An exemplary embodiment of a configuration of a transform processor 110 in accordance with principles of inventive concepts will be described in greater detail in the discussion related to FIGS. 3 and 4.

In exemplary embodiments in accordance with principles of inventive concepts, index determination logic 130 may identify an index satisfying a determination condition from among indexes respectively assigned to the coefficients that may be employed to form an image. In particular, the index determination logic 130 may identify an index satisfying the determination condition based on at least one of the first transformed data and the second transformed data, which are generated by the transform processor 110. An exemplary embodiment of a determination condition in accordance with principles of inventive concepts will be described in greater detail in the discussion related to FIG. 5.

In exemplary embodiments in accordance with principles of inventive concepts, energy compaction determination logic 150 may determine energy compaction of at least one of the first transformed data and the second transformed data. In particular, the energy compaction determination logic 150 may determine the energy compaction using an index determined by the index determination logic 130. Exemplary embodiments of energy and the energy compaction in accordance with principles of inventive concepts will be described in greater detail in the discussion related to FIG. 5.

In exemplary embodiments in accordance with principles of inventive concepts, output selection logic 170 may selectively output one of the first transformed data and the second transformed data. In accordance with principles of inventive concepts, the output selection logic 170 may select data to be output based on the energy compaction determined by the energy compaction determination logic 150. Exemplary embodiments of selecting one of the first transformed data and the second transformed data in accordance with principles of inventive concepts will be described in greater detail in the discussion related to FIGS. 6, 8 and 9.

The entropy encoder 190 may encode data output from the output selection logic 170. In exemplary embodiments in accordance with principles of inventive concepts, the entropy encoder 190 may generate encoded data ENC_DAT. For example, the entropy encoder 190 may generate the encoded data ENC_DAT using a context adaptive variable length coding (CAVLC), a context adaptive binary arithmetic coding (CABAC), a syntax-based-context-adaptive binary arithmetic coding (SBAC), a probability interval partitioning entropy (PIPE) coding, or other coding techniques.

Figure 2:
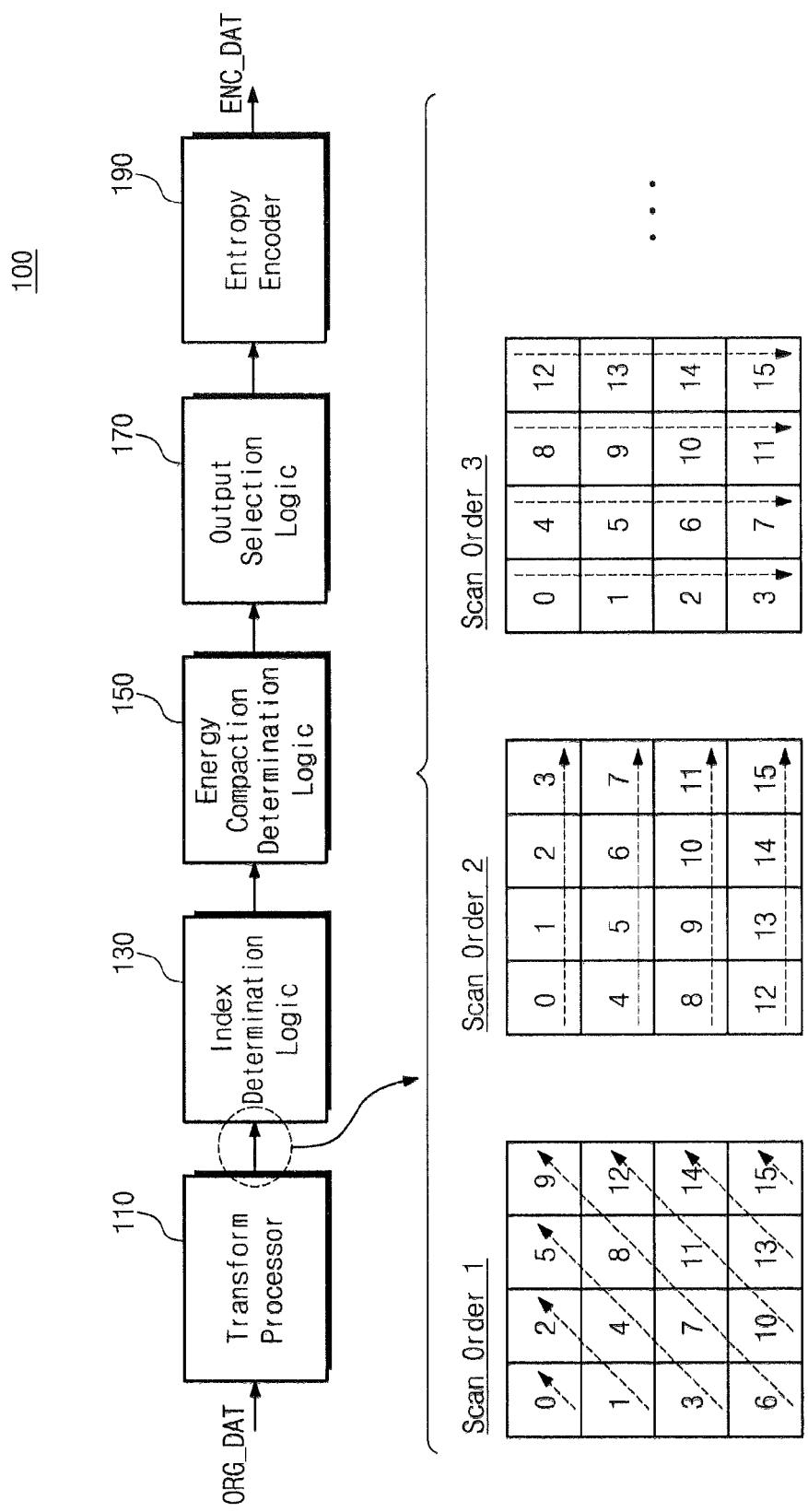
FIG. 2 is a conceptual diagram describing a scan order and an index in accordance with principles of inventive concepts.

FIG. 2 is a conceptual diagram describing an exemplary embodiment of a scan order and an index in accordance with principles of inventive concepts.

As described with reference to FIG. 1, original data ORG_DAT may include video information that may be employed to form an image by pixel unit and frame unit. For illustrative purposes, it is assumed that the original data ORG_DAT includes video information respectively corresponding to pixels of a 4×4 size. However, it will be apparent to one of ordinary skill in the art that inventive concepts are not limited to the above assumption. For example, the video information included in the original data ORG_DAT may correspond to pixels of a 16×16 size, a 32×32 size, or other sizes.

Coefficients corresponding to pixels of a 4×4 size is illustrated in FIG. 2. The index determination logic 130 may scan the coefficients to identify an index satisfying a determination condition. In exemplary embodiments in accordance with principles of inventive concepts, the index determination logic 130 may scan the coefficients respectively corresponding to pixels of a 4×4 size according to a specific scan order. That is, the coefficients may be scanned according to the scan order. An index may be assigned to each of the coefficients according to the scan order with respect to the coefficients.

In an exemplary embodiment, a number 0 index may be assigned to a coefficient being firstly scanned, a number 1 index may be assigned to a coefficient being secondly scanned, and a number 15 index may be assigned to a coefficient being lastly scanned. In such exemplary embodiments, because the number of coefficients corresponding to pixels of a 4×4 size is 16, the index may have numbers 0 to 15. However, as mentioned above, inventive concepts are not limited thereto.

Exemplary embodiments of scan orders and associated indexes (that is, index numbers) are illustrated in FIG. 2. The first scan order is an up-right diagonal scan order. The second scan order is a horizontal scan order. The third scan order is a vertical scan order. The transform processor 110 may scan video information according to any of the first to third scan orders, for example.

However, the scan orders and the associated assigned indexes illustrated in FIG. 2 are merely examples and inventive concepts are not limited to the scan orders and the assigned indexes illustrated in FIG. 2.

Figure 3:
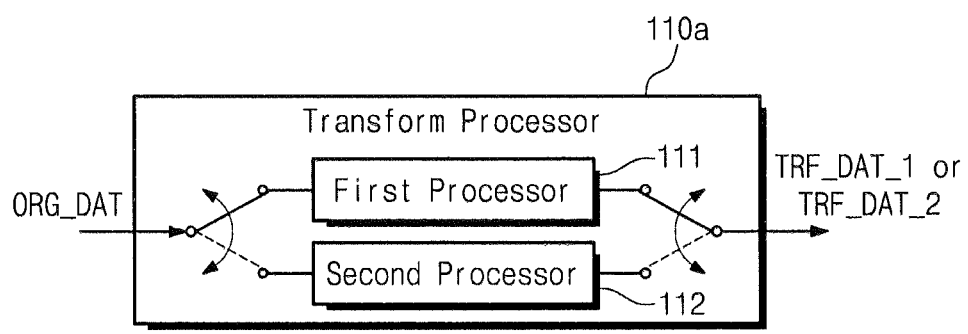
FIG. 3 is a block diagram illustrating a transform processor of a video encoding circuit in accordance with principles of inventive concepts.

FIG. 3 is a block diagram illustrating an exemplary embodiment of a transform processor 110 (refer to FIG. 1) of a video encoding circuit 100 (refer to FIG. 1) in accordance with principles of inventive concepts. In exemplary embodiments, transform processor 110 of FIG. 1 may have a configuration of a transform processor 110a illustrated in FIG. 3. The transform processor 110a may receive original data ORG_DAT and may include a first processor 111 and a second processor 112.

The first processor 111 may process the original data ORG_DAT with a first processing method, and the second processor 111 may process the original data ORG_DAT with a second processing method. However, processing methods being used by the first processor 111 and the second processor 112 may be exchanged.

In exemplary embodiments in accordance with principles of inventive concepts, the original data ORG_DAT may be selectively provided to one of the first processor 111 and the second processor 112. One of first transformed data TRF_DAT_1 generated by the first processor 111 or second transformed data TRF_DAT_2 generated by the second processor 112 may be output. That is, the transform processor 110a may selectively output one of the first transformed data TRF_DAT_1 or the second transformed data TRF_DAT_2.

Figure 4:
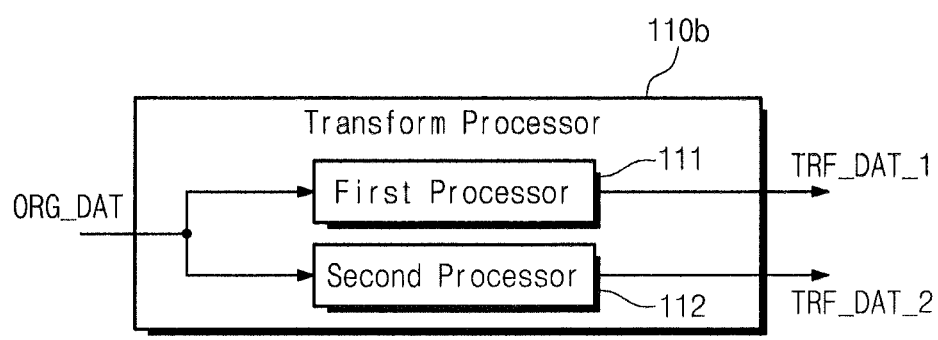
FIG. 4 is a block diagram illustrating a transform processor of a video encoding circuit in accordance with principles of inventive concepts.

FIG. 4 is a block diagram illustrating an exemplary embodiment of a transform processor 110 (refer to FIG. 1) of a video encoding circuit 100 (refer to FIG. 1) in accordance with principles of inventive concepts. In exemplary embodiments in accordance with principles of inventive concepts, transform processor 110 of FIG. 1 may have a configuration of a transform processor 110b illustrated in FIG. 4. The transform processor 110b may receive original data ORG_DAT and may include a first processor 111 and a second processor 112.

In exemplary embodiments in accordance with principles of inventive concepts, the first processor 111 may process the original data ORG_DAT with the first processing method, and the second processor 111 may process the original data ORG_DAT with the second processing method. Processing methods being used by the first processor 111 and the second processor 112 may be exchanged.

In exemplary embodiments in accordance with principles of inventive concepts, the original data ORG_DAT may be provided to the first processor 111 and the second processor 112 substantially simultaneously. First transformed data TRF_DAT_1 generated by the first processor 111 and second transformed data TRF_DAT_2 generated by the second processor 112 may be output together. That is, the transform processor 110b may output the first transformed data TRF_DAT_1 together with the second transformed data TRF_DAT_2.

Embodiments corresponding to transform processor 110a may be said to operate sequentially, while embodiments corresponding to transform processor 110b may be said to operate in parallel. That is, in exemplary embodiments in accordance with principles of inventive concepts corresponding to the transform processor 110a of FIG. 3, the first processor 111 and the second processor 112 may operate sequentially (that is, serially) and in embodiments corresponding to the transform processor 110b of FIG. 4, the first processor 111 and the second processor 112 may operate in parallel. Each of the transform processors 110a and 110b may be implemented using hardware, software, firmware, application-specific integrated circuit, digital signal processor, or a combination thereof, for example. In exemplary embodiments, the transform processor 110a of FIG. 3 may be implemented substantially in software, and the transform processor 110b of FIG. 4 may be implemented substantially in hardware.

Figure 5:
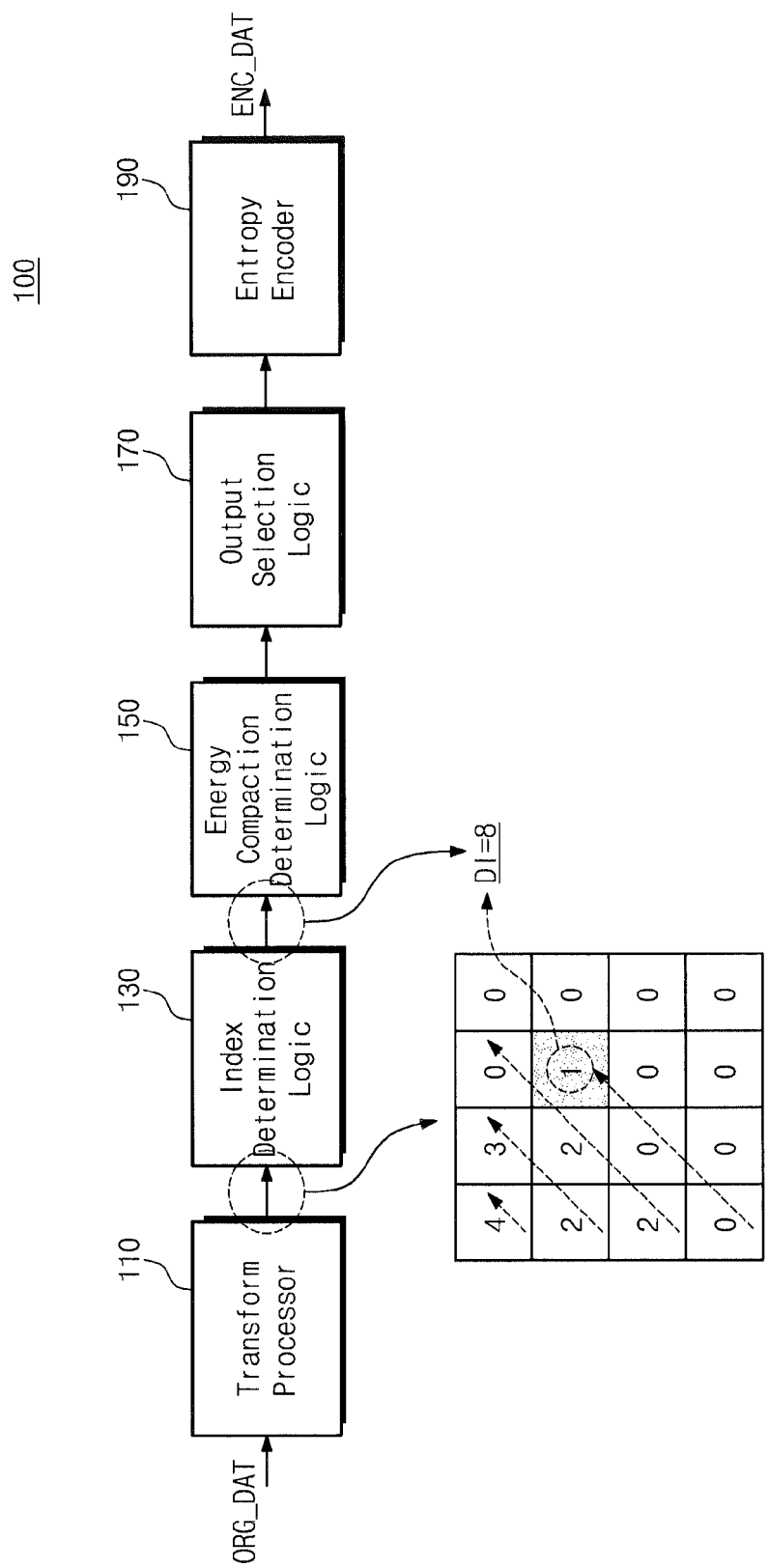
FIG. 5 is a conceptual diagram describing a determination condition, energy, and energy compaction.

FIG. 5 is a conceptual diagram for describing a determination condition, energy, and energy compaction.

As described with reference to FIG. 1, index determination logic 130 may determine an index satisfying a determination condition from among indexes respectively assigned to a coefficients. The index determination logic 130 may receive at least one of first transformed data and second transformed data from a transform processor 110.

Hereinafter, it is assumed that a video encoding circuit 100 operates according to a HEVC standard. The first transformed data and the second transformed data may include coefficients. An example of coefficients respectively corresponding to pixels of a 4×4 size is illustrated in FIG. 5. In exemplary embodiments it is assumed that the coefficients are scanned according to an up-right diagonal scan order. However, the above assumptions are only to help understanding of the inventive concepts, and inventive concepts are not to limit to the above assumptions.

The coefficients may include 0 and/or non-zero values. When a value of a coefficient corresponding to a specific pixel is 0, the coefficient is said to have no energy. A coefficient corresponding to a specific pixel having a non-zero value, is said to have energy. Coefficient energy is an indication of whether there is data for expressing an image; no energy indicates there is no data for expressing an image.

In exemplary embodiments in accordance with principles of inventive concepts, an index satisfying a determination condition may be an index having the greatest value from among indexes respectively assigned to one or more coefficients having energy (that is, having non-zero values). In exemplary embodiments, the index determination logic 130 may identify an index having the greatest value from among the indexes assigned to coefficients having energy. In the example of FIG. 5, when coefficients are scanned according to a scan order, the ninth coefficient has an index of the greatest value from among coefficients having energy. As a result, in FIG. 5, the index determination logic 130 may determine an index having a value of 8. That is that is, in this exemplary embodiment, the value of the determined index DI (also referred to herein as a determination index, or identification index) is 8 because indexes are incremented sequentially from 0 in order of the diagonal scan starting in the upper left corner and the last coefficient with a non-zero value is the ninth one, having an index value of DI=8 when incremented from a starting point of 0. The thus-identified coefficient index may also be referred to herein as an identified, or upper, coefficient index value or as a terminal energy index, for example. In exemplary embodiments in accordance with principles of inventive concepts, the index determination logic 130 may identify the highest index value associated with coefficients having energy. The coefficients themselves, as indicated above, are derived from at least one of the first transformed data and the second transformed data.

As described with reference to FIG. 1, energy compaction determination logic 150 may determine the level of energy compaction of transformed data. Energy compaction refers to the degree to which energy (that is, image data content) is concentrated, as reflected by an upper coefficient index, or terminal energy index, value. Consequently, the smaller the value of the index determined by the index determination logic 130 is (that is, the lower the upper coefficient index or terminal energy index), the greater the energy compaction is. When the energy compaction is higher, the number of coefficients having a value of 0 is higher. With higher energy compaction, then, in accordance with principles of inventive concepts, the quantity of coefficients being transferred to the entropy encoder 190 may be reduced. In accordance with principles of inventive concepts, the energy compaction determination logic 150 may reduce the quantity of coefficients being transferred to the entropy encoder 190 by determining the energy compaction based, as indicated by the index identified by the index determination logic 130 as the upper coefficient index.

As described with reference to FIG. 1, in accordance with principles of inventive concepts, output selection logic 170 may selectively output one of the first transformed data or the second transformed data, based on the energy compaction, as determined by the energy compaction determination logic 150, for encoding by entropy encoder 190. That is, in accordance with principles of inventive concepts, first or second transformed data may be selectively encoded according to the level of energy compaction, thereby increasing the efficiency and performance of a video encoding process. Energy compaction may be determined, in accordance with principles of inventive concepts, by indexing coefficients and identifying an index that can be associated with the level of energy compaction (an upper coefficient index, for example).

Figure 6:
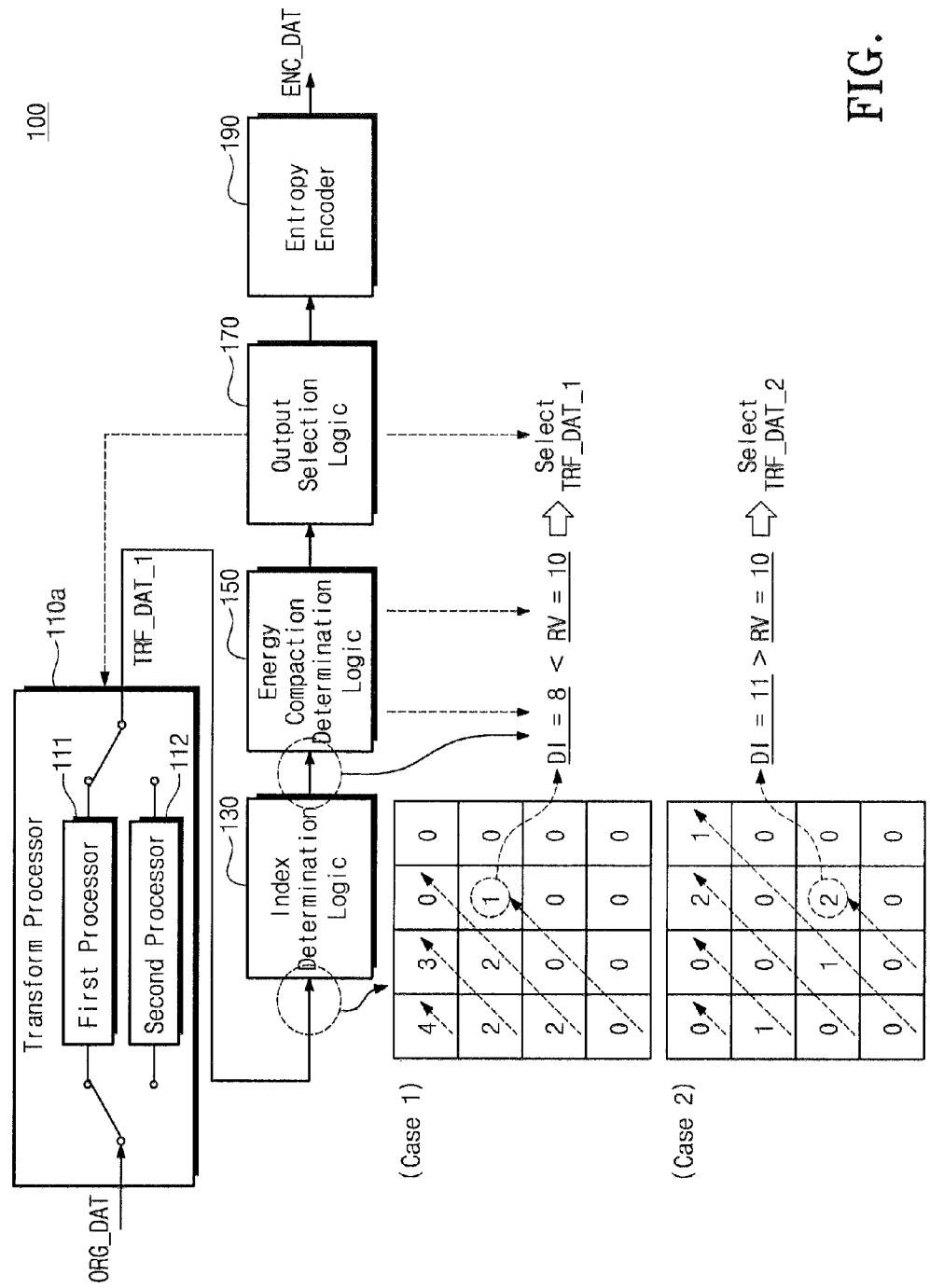
FIG. 6 is a conceptual diagram describing a first embodiment of generating encoded data.

FIG. 6 is a conceptual diagram for describing a first exemplary embodiment of generating encoded data in accordance with principles of inventive concepts.

In the first exemplary embodiment of FIG. 6, a transform processor 110a including a first processor 111 and a second processor 112 which operate in series (refer to FIG. 3) may be used. Transform processor 110a may firstly generate first transformed data TRF_DAT_1. The transform processor 110a may be configured to firstly generate second transformed data TRF_DAT_2 but it is assumed, for this illustration, that the first transformed data TRF_DAT_1 is generated first. The first processor 111 of the transform processor 110a may process original data ORG_DAT by using a first processing method to generate the first transformed data TRF_DAT_1. The first transformed data TRF_DAT_1 may be provided to index determination logic 130. The first transformed data TRF_DAT_1 may include a coefficients respectively corresponding to pixels of a size 4×4.

At first, a case 1 will be described. The index determination logic 130 may identify an index satisfying a determination condition (for example, an upper or terminal index value) from among indexes respectively assigned to one or more coefficients included in the first transformed data TRF_DAT_1. When the coefficients are scanned according to an up-right diagonal scan order, the ninth coefficient has an index of the greatest value of coefficients having energy. As a result, in the case 1, the index determination logic 130 may determine an index having a value of 8 (that is, a value of the determined index DI is 8).

Energy compaction determination logic 150 may determine energy compaction of the first transformed data TRF_DAT_1. In this exemplary embodiment the energy compaction determination logic 150 may compare the value of the determined index DI with a reference value RV. In exemplary embodiments, when the value of the determined index DI is smaller than the reference value RV, the energy compaction of the first transformed data TRF_DAT_1 is relatively high. On the other hand, when the value of the determined index DI is greater than the reference value RV, the energy compaction of the first transformed data TRF_DAT_1 is relatively low.

For example, it is assumed that the reference value RV is 10. In the case 1, because the value of the determined index DI is smaller than the reference value RV, the energy compaction determination logic 150 may determine that the energy compaction of the first transformed data TRF_DAT_1 is relatively high (that is, higher than associated with the reference value). Accordingly, output selection logic 170 may select the first transformed data TRF_DAT_1 based on a determination result of the energy compaction determination logic 150. Entropy encoder 190 may encode the first transformed data TRF_DAT_1 provided from the output selection logic 170. In the case 1, the encoded data ENC_DAT may be generated based on the first transformed data TRF_DAT_1. That is, in exemplary embodiments in accordance with principles of inventive concepts, transformed data TRF_DAT_1 associated with an energy compaction that is greater than a reference value may be selected for encoding by an entropy encoder.

Next, a case 2 is described. When coefficients are scanned according to an up-right diagonal scan order, as in case 1, the coefficient having an index value of 11 (the twelfth coefficient of the scan) is the last of the coefficients having a non-zero value and, as a result, the identified index value (as determined by index determination logic 130) is DI=11, that is The energy compaction determination logic 150 may determine energy compaction of the first transformed data TRF_DAT_1. In the first embodiment of FIG. 6, the energy compaction determination logic 150 may compare a value of the identified, or determined, index DI with the reference value RV. In case 2, because the value of the determined index DI is greater than the reference value RV, the energy compaction determination logic 150 may determine that the energy compaction of the first transformed data TRF_DAT_1 is relatively low, (that is, not high). Accordingly, the output selection logic 170 may select the second transformed data TRF_DAT_2 for encoding, rather than first transformed data TRF_DAT_1. In situations such as this, where the energy compaction does not exceed a reference, or threshold, value (that is, case 2), the transform processor 110a may not generate the second transformed data TRF_DAT_2 immediately. For example, the output selection logic 170 (or the energy compaction determination logic 150, or another component) may request, via a signal to transform processor 110a, that the second transformed data TRF_DAT_2 be provided to the entropy encoder 190. In this manner, the transform processor 110a may further generate the second transformed data TRF_DAT_2, and the output selection logic 170 may output the second transformed data TRF_DAT_2. The entropy encoder 190 may encode the second transformed data TRF_DAT_2 provided from the output selection logic 170. That is, in exemplary embodiments in accordance with principles of inventive concepts, when energy compaction is less than a threshold amount (for example, case 2), the encoded data ENC_DAT may be generated based on the second transformed data TRF_DAT_2.

In summary, in the first exemplary embodiment of FIG. 6 in accordance with principles of inventive concepts, when the value of the determined index DI is equal to or smaller than the reference value RV (that is, when energy compaction is greater than or equal to a threshold amount), the output selection logic 170 may output the first transformed data TRF_DAT_1. On the other hand, when the value of the determined index DI is greater than the reference value RV (that is, when energy compaction is less than a threshold amount), the second processor 112 of the transform processor 110a may generate the second transformed data TRF_DAT_2 with the second processing method, and the output selection logic 170 may output the second transformed data TRF_DAT_2. According to the first embodiment of FIG. 6, the second transformed data TRF_DAT_2 may be generated only when the second transformed data TRF_DAT_2 is selected, thereby improving efficiency by eliminating the generation of second transformed data unless deemed necessary, as determined by an assessment of energy compaction.

On the other hand, the transform processor 110a may firstly generate the second transformed data TRF_DAT_2; the index determination logic 130 may identify an index satisfying a determination condition from among indexes respectively assigned to one or more coefficients included in the second transformed data TRF_DAT_2; energy compaction determination logic 150 may compare a value of the determined index DI with a reference value RV; and, when the value of the determined index DI is equal to or smaller than the reference value RV, the output selection logic 170 may output the second transformed data TRF_DAT_2. And, when the value of the determined index DI is greater than the reference value RV, the transform processor 110a may further generate the first transformed data TRF_DAT_1, and the output selection logic 170 may output the first transformed data TRF_DAT_1.

In exemplary embodiments in accordance with principles of inventive concepts, the encoded data ENC_DAT may include a flag value. The flag value may correspond to information associated with data that is used to generate the encoded data ENC_DAT from among the first transformed data TRF_DAT_1 and the second transformed data TRF_DAT_2. As will be described in greater detail below, the flag value may be referred when the encoded data ENC_DAT is decoded. Referring to the flag value, a decoding method may be determined.

Although, in the above descriptions, the reference value RV is 10 inventive concepts are not limited thereto and may be selected, by an experiment, to have a value which allows the best result in terms of an optimum combination of highest quality image and greatest efficiency, for example. In exemplary embodiments, the reference value RV may be a fixed value and may be stored in a memory (e.g., a register) disposed inside or outside the video encoding circuit 100. In other exemplary embodiments, the reference value RV may be a variable value which differs depending on a type of an image formed based on video information included in the original data ORG_DAT. An exemplary configuration of a video encoding circuit in accordance employing a variable reference value in accordance with principles of inventive concepts will be described with reference to FIG. 7.

Figure 7:
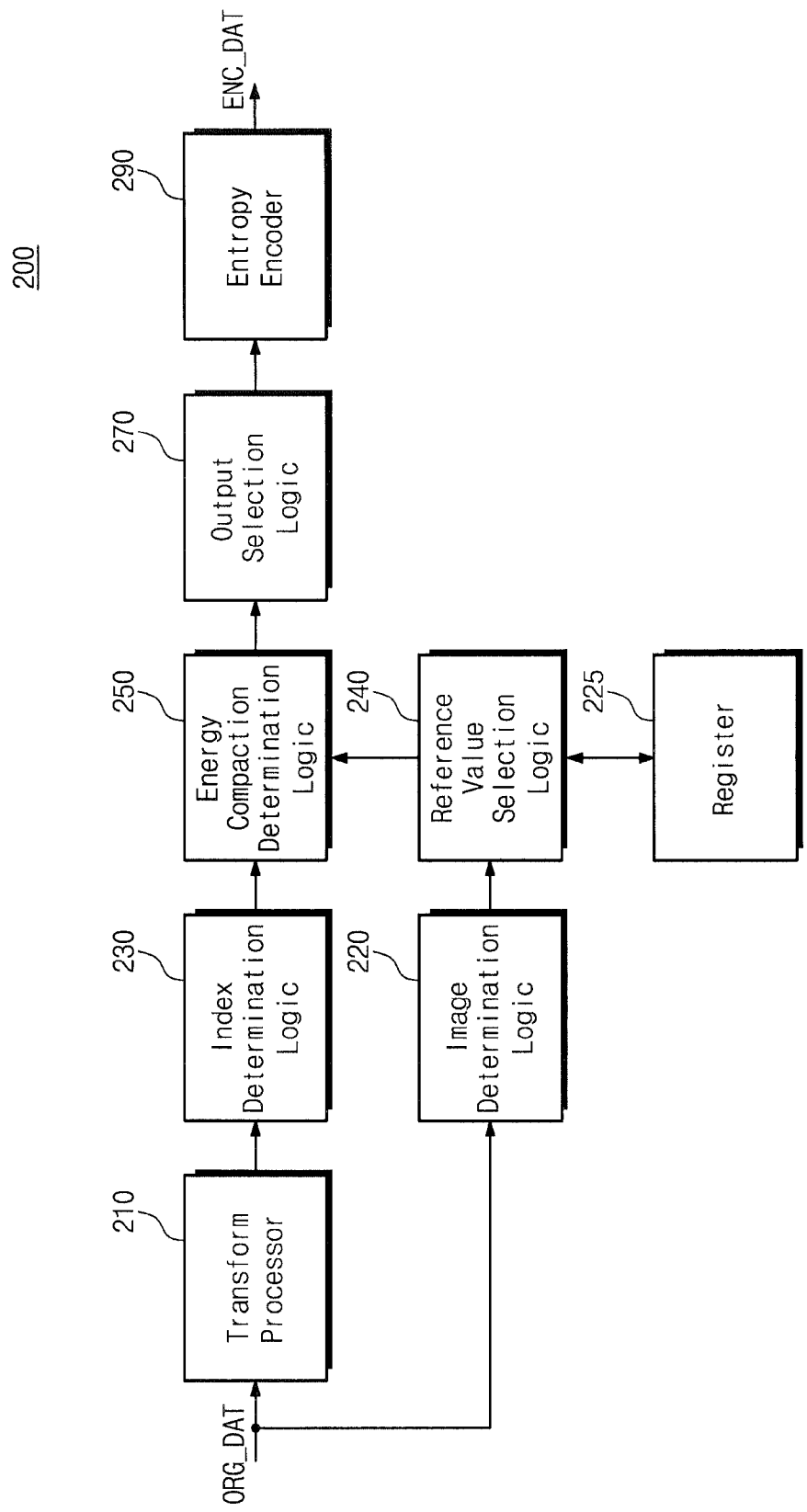
FIG. 7 is a block diagram illustrating a video encoding circuit in accordance with principles of inventive concepts.

FIG. 7 is a block diagram illustrating an exemplary embodiment of a video encoding circuit 200 in accordance with principles of inventive concepts. The video encoding circuit 200 may include a transform processor 210, image determination logic 220, a register 225, index determination logic 230, reference value selection logic 240, energy compaction determination logic 250, output selection logic 270 and entropy encoder 290.

Configurations and functions of the transform processor 210, the index determination logic 230, the energy compaction determination logic 250, the output selection logic 270 and the entropy encoder 290 of FIG. 7 may include configurations and functions of a transform processor 110, index determination logic 130, energy compaction determination logic 150, output selection logic 170 and an entropy encoder 190 of FIG. 1, respectively. Redundant descriptions associated with configurations and functions of the transform processor 210, the index determination logic 230, the energy compaction determination logic 250, the output selection logic 270 and the entropy encoder 290 of FIG. 7 will not be repeated here.

In exemplary embodiments image determination logic 220 may determine which type of image (for example, a natural image or a screen content image) is formed, based on video information included in original data ORG_DAT.

The register 225 may store a plurality of reference values respectively corresponding to different image types. For example, the register 225 may store a reference value for use in encoding of a natural image and a reference value for use in encoding of a screen content image and may store a corresponding relationship between the image types and the reference values in the form of look-up table.

The reference value selection logic 240 may select one of the reference values stored in the register 225 according to the result of an image-type determination carried out by image determination logic 220, for example. The reference value selection logic 240 may provide the selected reference value to the energy compaction determination logic 250. The energy compaction determination logic 250 may compare a value of an index determined by the index determination logic 230 with the reference value provided from the reference value selection logic 240.

In exemplary embodiments in accordance with principles of inventive concepts, such as the exemplary embodiment of FIG. 7, a reference value may have different values depending on a type of image and a system and method in accordance with principles of inventive concepts may thereby select a reference value which allows the best result (e.g., the best image quality) to be obtained.

Figure 8:
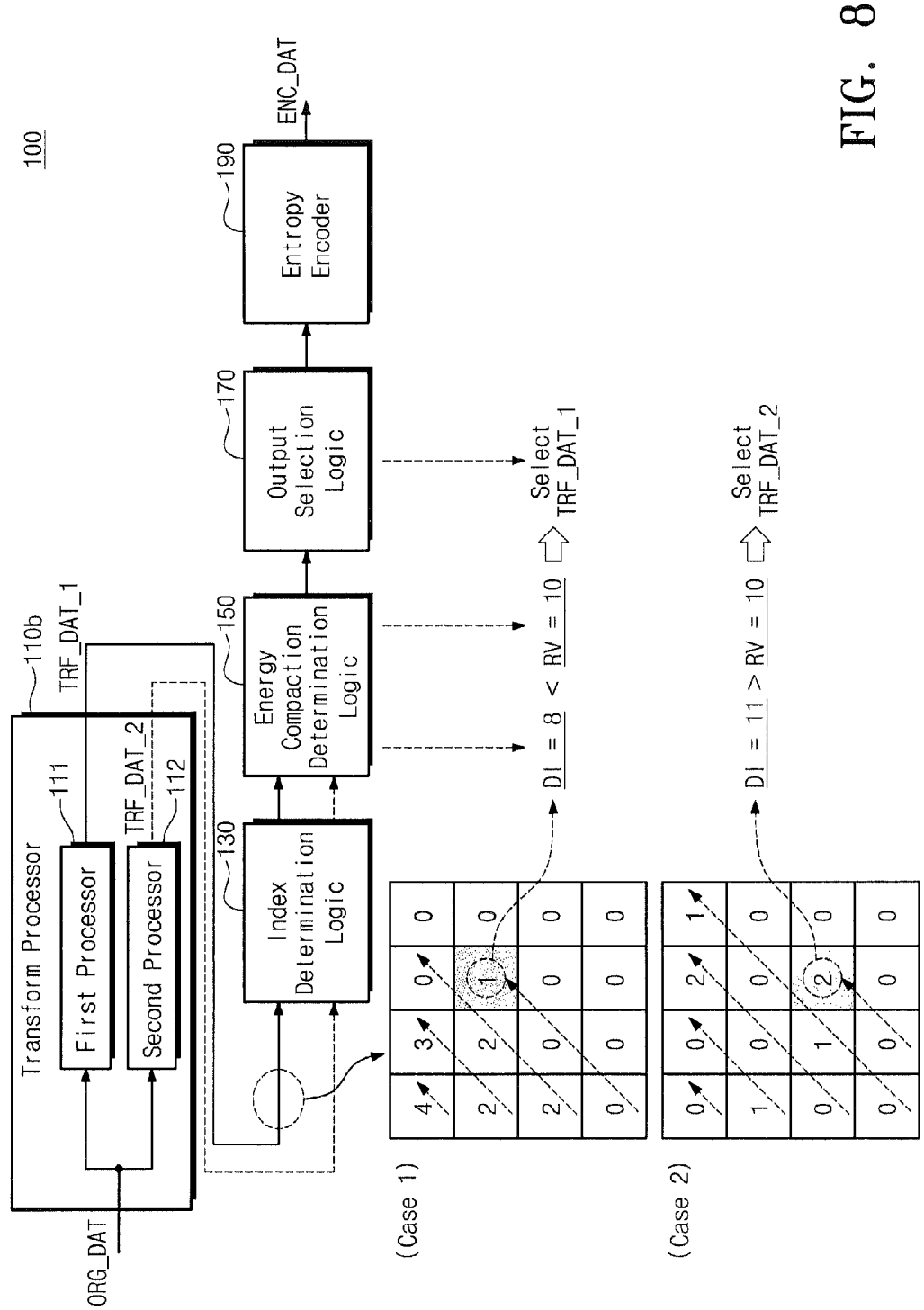
FIG. 8 is a conceptual diagram describing a second embodiment of generating encoded data.

FIG. 8 is a conceptual diagram describing a second exemplary embodiment in accordance with principles of inventive concepts for generating encoded image data.

In the second embodiment of FIG. 8, a transform processor 110b including a first processor 111 and a second processor 112 which operate in parallel may be used. That is, the transform processor 110b may generate first transformed data TRF_DAT_1 simultaneously with second transformed data TRF_DAT_2 being generated. The first processor 111 may generate the first transformed data TRF_DAT_1 using a first processing method and second processor 112 may generate the second transformed data TRF_DAT_2 using a second processing method. The first transformed data TRF_DAT_1 and the second transformed data TRF_DAT_2 may be provided to index determination logic 130. In exemplary embodiments in accordance with principles of inventive concepts, each of the first transformed data TRF_DAT_1 and the second transformed data TRF_DAT_2 may include a coefficients respectively corresponding to pixels of a size 4×4.

At first, a case 1 (a scenario in which DI=8) will be described. The index determination logic 130 may determine, or identify, an index satisfying a determination condition from among indexes respectively assigned to the coefficient included in the first transformed data TRF_DAT_1. In this exemplary embodiment, the coefficients are scanned according to an up-right diagonal scan order and the ninth coefficient has an index of the greatest value from among one or more coefficients having energy. As a result, in case 1, the index determination logic 130 may identify an index having a value of 8 (that is, a value of the determined index DI is 8).

Energy compaction determination logic 150 may determine energy compaction of the first transformed data TRF_DAT_1. In particular, in the embodiment of FIG. 8, the energy compaction determination logic 150 may compare a value of the determined index DI with a reference value RV. In the embodiment of FIG. 8, it is assumed that the reference value RV is 10. In the case 1, because the value of the determined index DI is smaller than the reference value RV, the energy compaction determination logic 150 may determine that the energy compaction of the first transformed data TRF_DAT_1 is relatively high. Accordingly, the output selection logic 170 may select the first transformed data TRF_DAT_1 based on a determination of the energy compaction determination logic 150. The entropy encoder 190 may encode the first transformed data TRF_DAT_1 provided from the output selection logic 170. That is, in the case 1, the encoded data ENC_DAT may be generated based on the first transformed data TRF_DAT_1.

Next, a case 2 (in which DI=11) will be described. When the coefficients are scanned according to an up-right diagonal scan order, the twelfth coefficient has an index of the greatest value from among one or more coefficients having energy. Thus, in the case 2, the index determination logic 130 may determine an index having a value of 11 (that is, a value of the determined index DI is 11).

The energy compaction determination logic 150 may determine the energy compaction of the first transformed data TRF_DAT_1. In particular, in the embodiment of FIG. 8, the energy compaction determination logic 150 may compare the value of the determined index DI with the reference value RV. In the case 2, because the value of the determined index DI is greater than the reference value RV, the energy compaction determination logic 150 may determine that the energy compaction of the first transformed data TRF_DAT_1 is not high. Accordingly, the output selection logic 170 may select the second transformed data TRF_DAT_2 based on a result of the energy compaction determination logic 150.

Unlike the first exemplary embodiment of FIG. 6, in the second embodiment of FIG. 8, the second transformed data TRF_DAT_2 has been generated substantially simultaneously, in parallel, with the first transformed data TRF_DAT_1. As a result, the output selection logic 170 may output the second transformed data TRF_DAT_2 without a separate process for generating the second transformed data TRF_DAT_2. Entropy encoder 190 may encode the second transformed data TRF_DAT_2 provided from the output selection logic 170. That is, in the case 2, the encoded data ENC_DAT may be generated based on the second transformed data TRF_DAT_2.

In summary, in the exemplary embodiment of FIG. 8, when the value of the determined index DI is equal to or smaller than the reference value RV, the output selection logic 170 may output the first transformed data TRF_DAT_1 and when the value of the determined index DI is greater than the reference value RV, the output selection logic 170 may output the second transformed data TRF_DAT_2. In the exemplary embodiment of FIG. 8, the first transformed data TRF_DAT_1 and the second transformed data TRF_DAT_2 may be generated together thereby increasing encoding speed.

Alternatively, the index determination logic 130 may determine an index satisfying a determination condition from among indexes respectively assigned to coefficients included in the second transformed data TRF_DAT_2. In such exemplary embodiments energy compaction determination logic 150 may compare a value of the determined index DI with a reference value RV. When the value of the determined index DI is equal to or smaller than the reference value RV, the output selection logic 170 may output the second transformed data TRF_DAT_2 and when the value of the determined index DI is greater than the reference value RV, the output selection logic 170 may output the first transformed data TRF_DAT_1.

In exemplary embodiments in accordance with principles of inventive concepts, the encoded data ENC_DAT may include a flag value, as previously described in the discussion related to FIG. 6.

Figure 9:
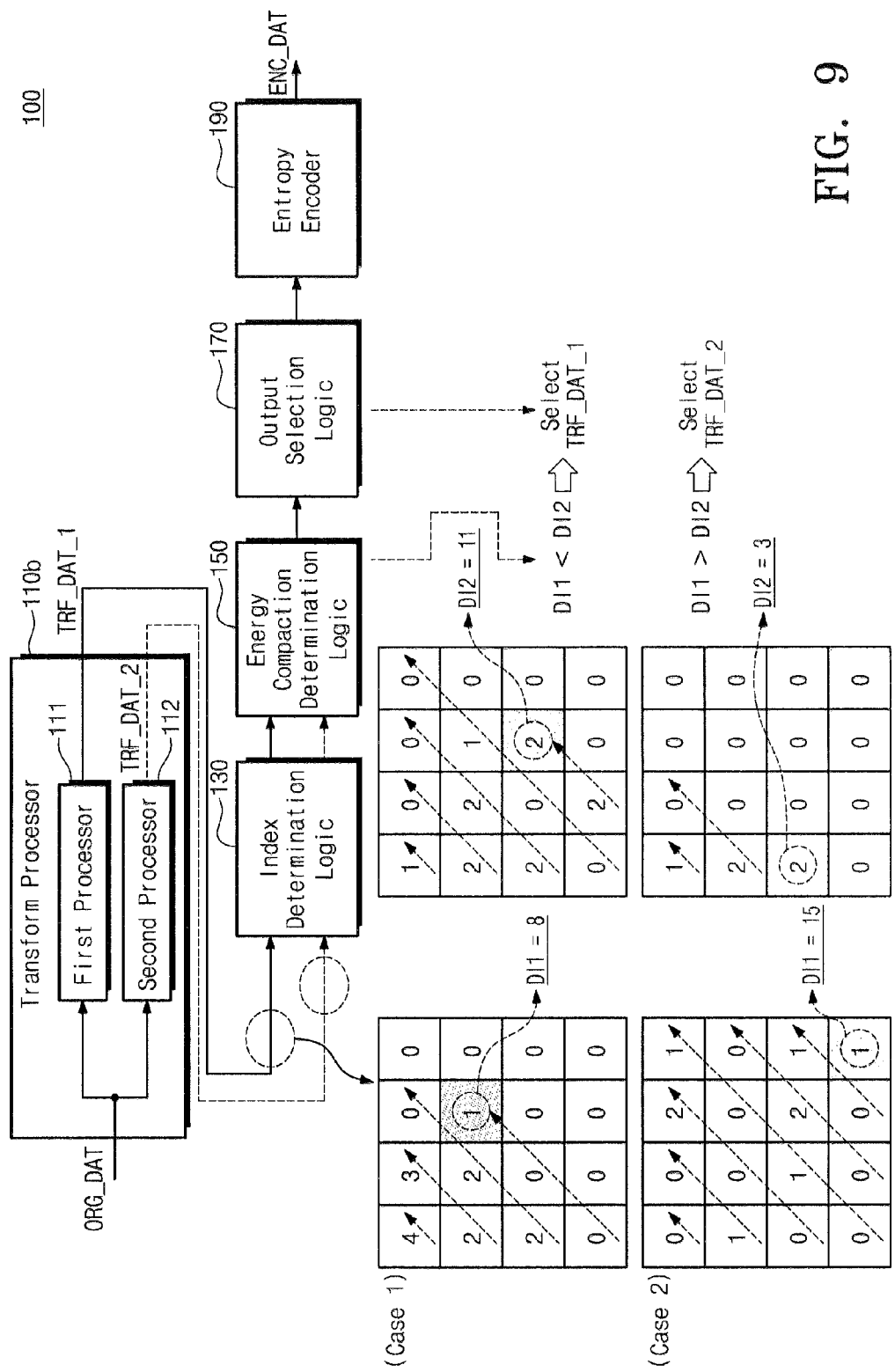
FIG. 9 is a conceptual diagram describing a third embodiment of generating encoded data.

FIG. 9 is a conceptual diagram illustrating a third exemplary embodiment for generating encoded data in accordance with principles of inventive concepts.

In the third embodiment of FIG. 9, a transform processor 110b including a first processor and a second processor 112 that operate in parallel may be used. That is, the transform processor 110b may generate first transformed data TRF_DAT_1 substantially simultaneously with second transformed data TRF_DAT_2. The first processor 111 may generate the first transformed data TRF_DAT_1 using a first method. The second processor 112 may generate the second transformed data TRF_DAT_2 using a second method. The first transformed data TRF_DAT_1 and the second transformed data TRF_DAT_2 may be provided to index determination logic 130. Each of the first transformed data TRF_DAT_1 and the second transformed data TRF_DAT_2 may include a coefficients respectively corresponding to pixels of a size 4×4, for example.

At first, a case 1 (a scenario in which a first DI1=8) will be described. In exemplary embodiments in accordance with principles of inventive concepts, index determination logic 130 may identify a first index satisfying a determination condition from among indexes respectively assigned to coefficients included in the first transformed data TRF_DAT_1. When the coefficients are scanned according to an up-right diagonal scan order, the ninth coefficient has an index of the greatest value from among coefficients having energy. As a result, in case 1, the index determination logic 130 may determine a first index having a value of 8 (that is, a value of the determined first index DI1 is 8).

Additionally, the index determination logic 130 may determine a second index satisfying the determination condition from among indexes respectively assigned to coefficients included in the second transformed data TRF_DAT_2. When the coefficients are scanned according to an up-right diagonal scan order, it may be appreciated that the twelfth coefficient has an index of the greatest value from among coefficients having energy. As a result, in case 1, the index determination logic 130 may determine a second index having a value of 11 (that is, a value of the determined second index DI2 is 11).

Energy compaction determination logic 150 may determine energy compaction of the first transformed data TRF_DAT_1 and the second transformed data TRF_DAT_2. In particular, in the exemplary embodiment of FIG. 9, the energy compaction determination logic 150 may compare a value of the determined first index DI1 with a value of the determined second index DI2. When the value of the determined first index DI1 is smaller than the value of the determined second index DI2, that is an indication that the energy compaction of the first transformed data TRF_DAT_1 is higher than the energy compaction of the second transformed data TRF_DAT_2. On the other hand, when the value of the determined first index DI1 is greater than the value of the determined second index DI2, that is an indication that the energy compaction of the second transformed data TRF_DAT_2 is higher than the energy compaction of the first transformed data TRF_DAT_1.

In case 1, because the value of the determined first index DI1 is smaller than the value of the determined second index DI2, the energy compaction determination logic 150 may determine that the energy compaction of the first transformed data TRF_DAT_1 is higher than the energy compaction of the second transformed data TRF_DAT_2. In accordance with principles of inventive concepts, output selection logic 170 may then select the first transformed data TRF_DAT_1 based on a determination result of the energy compaction determination logic 150. Entropy encoder 190 may encode the first transformed data TRF_DAT_1 provided from the output selection logic 170. That is, in case 1, encoded data ENC_DAT may be generated based on the first transformed data TRF_DAT_1, the transformed data with greater energy compaction.

Next, a case 2 (a scenario in which a first DI1=15) will be described. The index determination logic 130 may determine a first index satisfying a determination condition from among indexes respectively assigned to coefficients included in the first transformed data TRF_DAT_1. When the coefficients are scanned according to an up-right diagonal scan order, the sixteenth coefficient has an index of the greatest value from among coefficients having energy. As a result, in case 2, the index determination logic 130 may determine a first index having a value of 15 (that is, a value of the determined first index DI1 is 15).

Additionally, the index determination logic 130 may determine a second index satisfying a determination condition from among indexes respectively assigned to coefficients included in the second transformed data TRF_DAT_2. When the coefficients are scanned according to an up-right diagonal scan order, the fourth coefficient has an index of the greatest value from among one or more coefficients having energy. As a result, in the case 2, the index determination logic 130 may determine a second index having a value of 3 (that is, a value of the determined second index DI 2 is 3).

The energy compaction determination logic 150 may determine energy compaction of the first transformed data TRF_DAT_1 and the second transformed data TRF_DAT_2. In case 2, because the value of the determined first index DI1 is greater than the value of the determined second index DI2, the energy compaction determination logic 150 may determine that the energy compaction of the second transformed data TRF_DAT_2 is higher than the energy compaction of the first transformed data TRF_DAT_1. In accordance with principles of inventive concepts, output selection logic 170 may select the second transformed data TRF_DAT_2 based on a determination of the energy compaction determination logic 150. Entropy encoder 190 may encode the second transformed data TRF_DAT_2 provided from the output selection logic 170. That is, in case 2, encoded data ENC_DAT may be generated based on the second transformed data TRF_DAT_2.

In summary, in the third exemplary embodiment in accordance with principles of inventive concepts of FIG. 9, when the value of the determined first index DI1 is smaller than the value of the determined second index DI2, the output selection logic 170 may output the first transformed data TRF_DAT_1. On the other hand, when the value of the determined first index DI1 is greater than the value of the determined second index DI2, the output selection logic 170 may output the second transformed data TRF_DAT_2. Additionally, when the value of the determined first index DI1 is equal to the value of the determined second index DI2, the output selection logic 170 may output one of the first transformed data TRF_DAT_1 and the second transformed data TRF_DAT_2.

The encoded data ENC_DAT may include a flag value, as previously described in the discussion related to FIG. 6.

Figure 10:
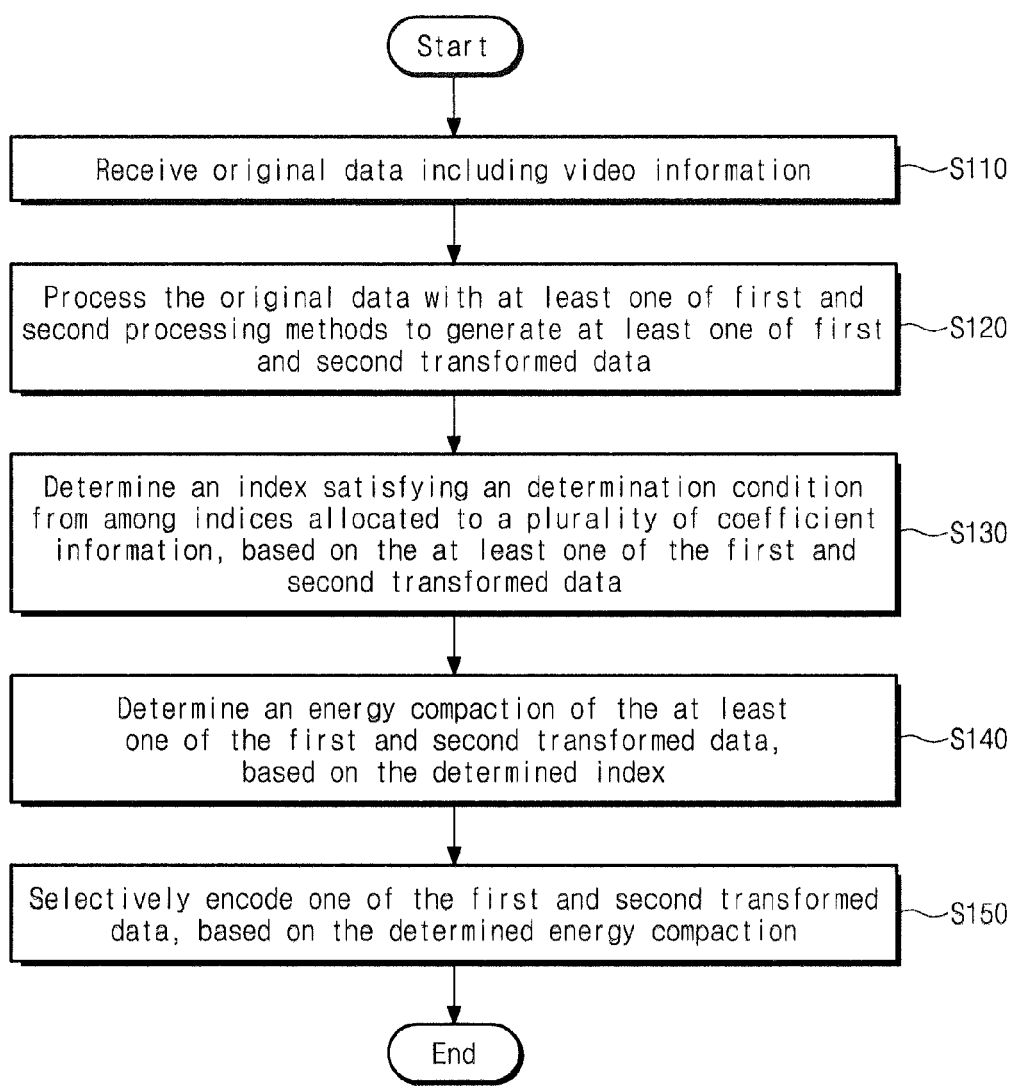
FIG. 10 is flow chart describing a video encoding method in accordance with principles of inventive concepts.

FIG. 10 is flow chart illustrating an exemplary video encoding method in accordance with principles of inventive concepts that may be used, for example, with a video encoding circuit such as circuit 100 of FIG. 1.

In operation S110, original data may be provided. The original data may include video information that forms an image by pixel unit and/or frame unit.

In operation S120, the original data may be processed using one of a first processing method and a second processing method, for example, yielding first and second transformed data, respectively.

In exemplary embodiments in accordance with principles of inventive concepts, when the encoding method of FIG. 10 is performed according to a HEVC standard, the first processing method may be performed by transforming the original data into frequency domain data and quantizing the frequency domain data, and the second processing method may be performed by quantizing the original data without transformation. In such exemplary embodiments, each of the first transformed data and the second transformed data may include a coefficients that may have an index assigned according to a scan order, as previously described, for example, in the discussion related to FIG. 2. An exemplary embodiment of performing the first method and the second method has been described in the discussion related to FIGS. 3 and 4.

In operation S130, an index satisfying a determination condition from among indexes respectively assigned to the coefficients forming an image may be determined. In particular, the index satisfying the determination condition may be determined based on at least one of the first transformed data and the second transformed data, which are generated in operation S120. An exemplary embodiment of a determination condition has been described in the discussion related to FIG. 5.

In operation S140, energy compaction of at least one of the first and second transformed data may be determined. In particular, the energy compaction may be determined based on the index determined in operation S130. Energy and energy compaction have been described, for example, in the discussion related to FIG. 5.

In operation S150, one of the first transformed data and the second transformed data may be selectively encoded. In exemplary embodiments in accordance with principles of inventive concepts, the data being encoded may be selected based on the energy compaction determined in operation S140. Exemplary embodiments of selecting one of the first transformed data and the second transformed data have been described, for example, in the discussions related to FIGS. 6, 8 and 9. The exemplary embodiments described in the discussions related to FIGS. 6, 8 and 9 will be discussed in greater detail in the discussion related to FIGS. 11 to 13.

Figure 11:
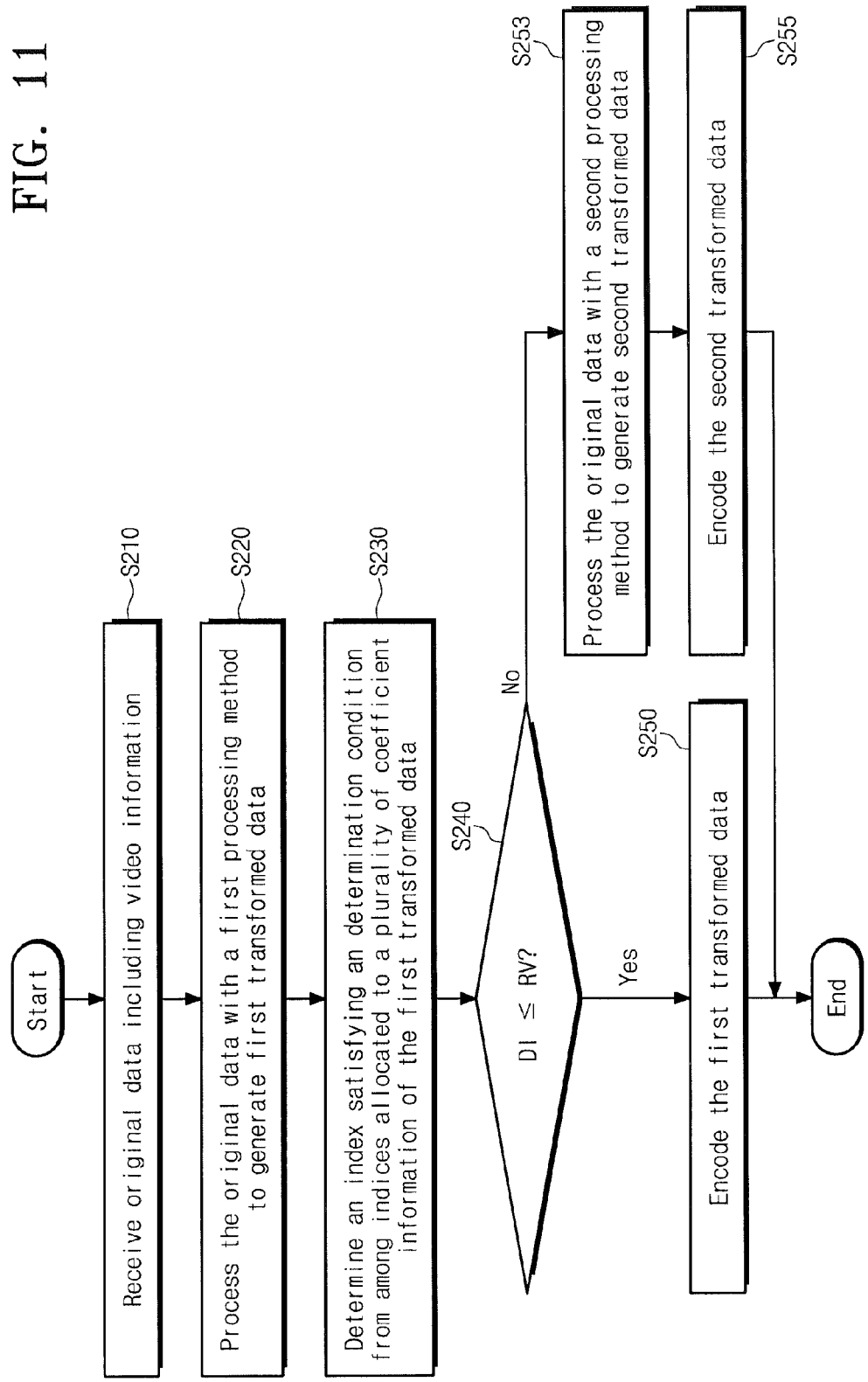
FIG. 11 is a flow chart describing a first embodiment of generating encoded data.

FIG. 11 is a flow chart illustrating a first exemplary embodiment of generating encoded data in accordance with principles of inventive concepts. That is, the video encoding method of FIG. 11 corresponds to the first exemplary embodiment, as described in the discussion related to FIG. 6.

In operation S210, original data may be provided. Processes of operation S210 may include processes such as described in the discussion related to operation S110 of FIG. 10, for example.

In operation S220, the original data may be processed using a first processing method, for example, to generate first transformed data.

In operation S230, an index satisfying the determination condition from among indexes respectively assigned to the coefficients of the first transformed data generated in operation S220 may be determined.

In operation S240, a value of the index determined in operation S230 may be compared with a reference value. When the value of the index determined in operation S230 is equal to or smaller than the reference value, operation S250 may be performed. In operation S250, the first transformed data may be encoded.

On the other hand, when the value of the index determined in operation S230 is greater than the reference value, operation S253 and operation S255 may be performed. In operation S253, the original data may be processed using a second processing method. As a result, second transformed data may be generated. In operation S255, the second transformed data may be encoded.

Figure 12:
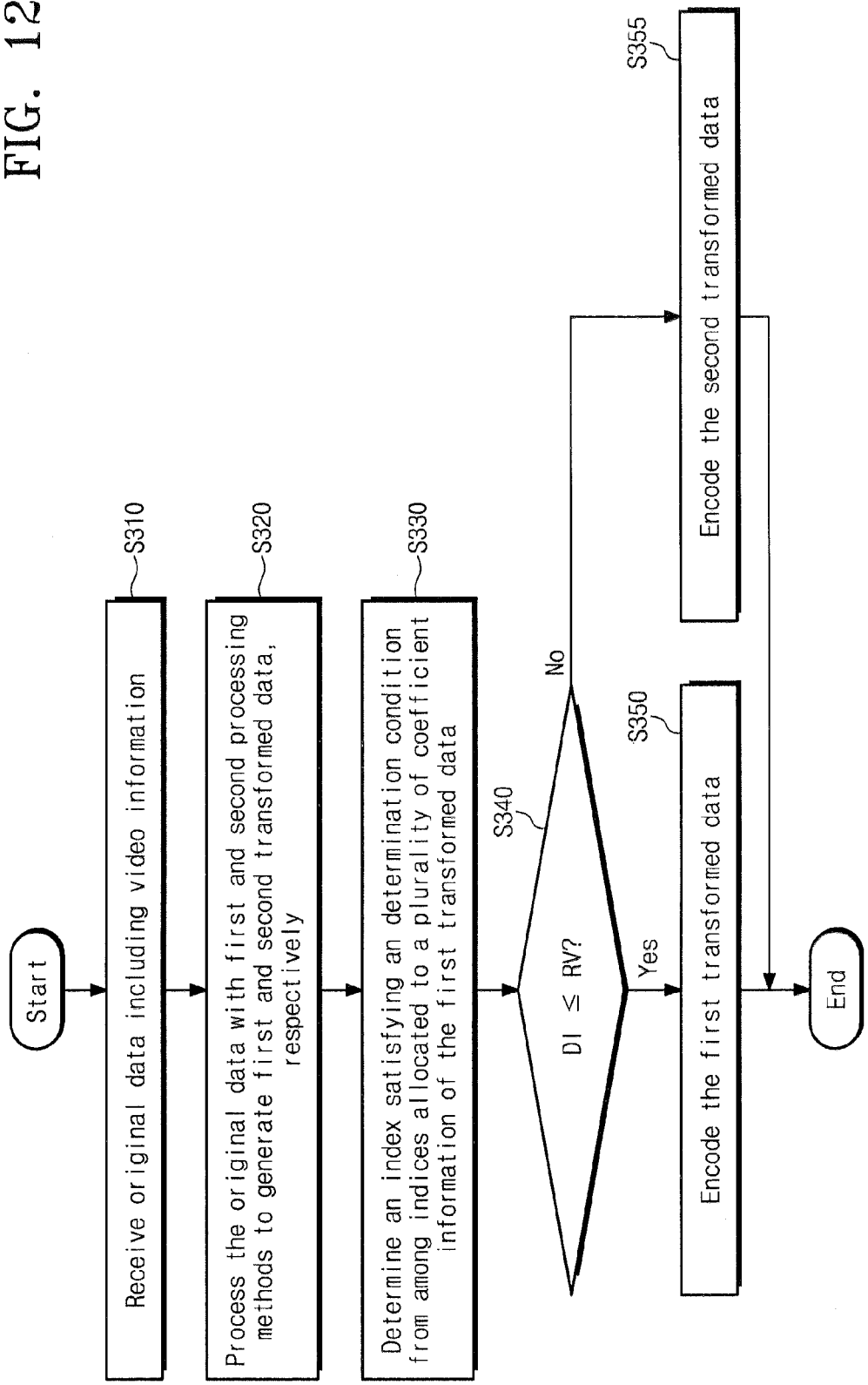
FIG. 12 is a flow chart describing a second embodiment of generating encoded data.

FIG. 12 is a flow chart describing a second exemplary embodiment of generating encoded data in accordance with principles of inventive concepts. The video encoding method of FIG. 12 corresponds to the second embodiment described in the discussion related to FIG. 8.

In operation S310, original data may be provided. Processes of operation S310 may include processes of operation S110 as described in the discussion related to FIG. 10.

In operation S320, the original data may be processed. In particular, in operation S320, the original data may be processed using a first processing method and a second processing method. When the original data is processed by the first and second processing methods, first and second transformed data may be generated, respectively.

In operation S330, an index satisfying a determination condition may be determined. In particular, the index satisfying the determination condition from among indexes respectively assigned to the coefficients of the first transformed data generated in operation S320 may be determined.

In operation S340, a value of the index determined in operation S330 may be compared with a reference value. When the value of the index determined in operation S330 is equal to or smaller than the reference value, operation S350 may be performed. In operation S350, the first transformed data may be encoded. On the other hand, when the value of the index determined in operation S330 is greater than the reference value, operation S355 may be performed. In operation S355, the second transformed data may be encoded.

Figure 13:
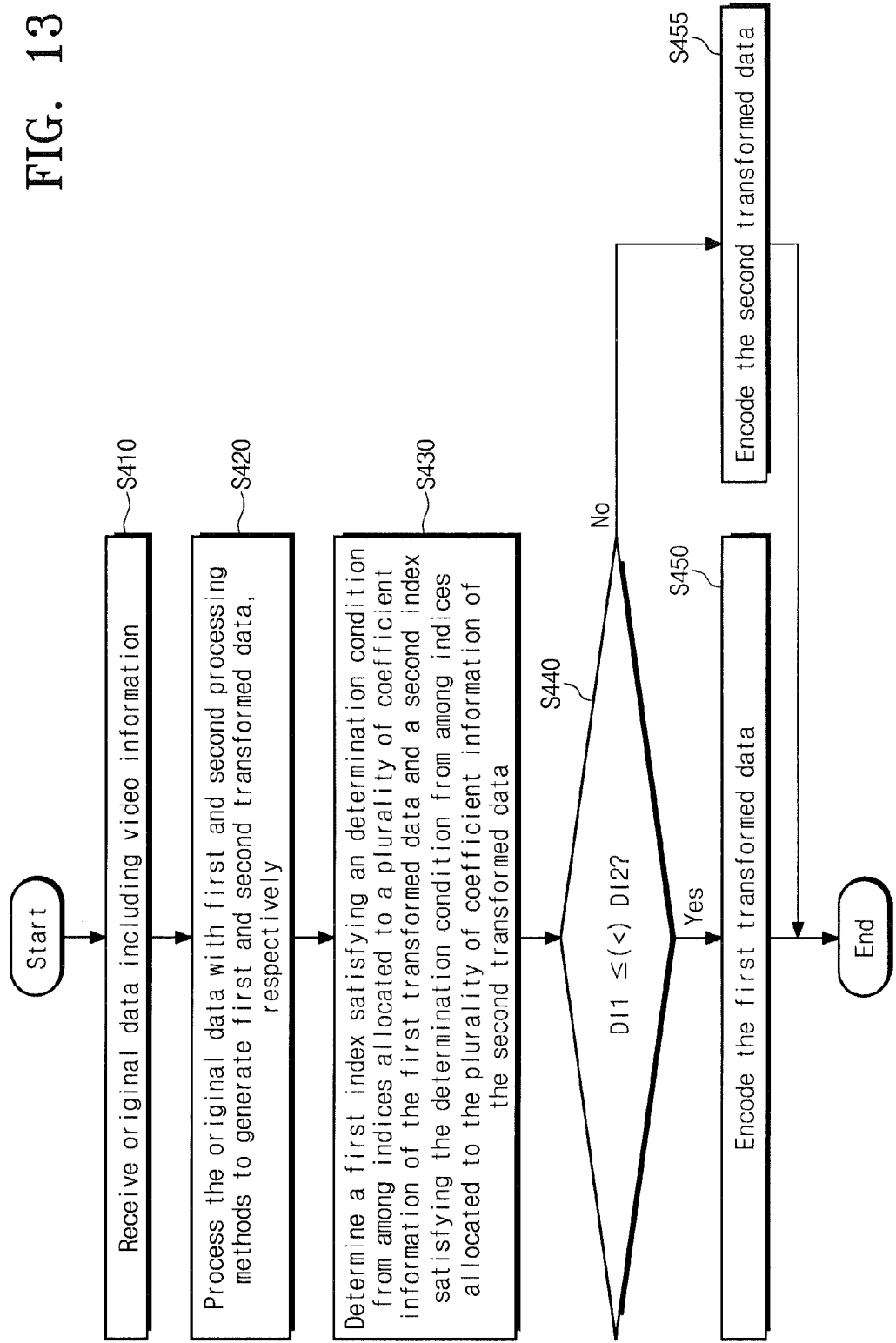
FIG. 13 is a flow chart describing a third embodiment of generating encoded data.

FIG. 13 is a flow chart describing a third exemplary embodiment of generating encoded data in accordance with principles of inventive concepts. The video encoding method of FIG. 13 corresponds to a third exemplary embodiment such as that described in the discussion related to FIG. 9.

In operation S410, original data may be provided. Processes of operation S410 may include processes such as operation S110 described in the discussion related to FIG. 10.

In operation S420, the original data may be processed, for example, using a first processing method and a second processing method. When the original data is processed by the first and second processing methods, first and second transformed data, respectively, may be generated.

In operation S430, an index satisfying a determination condition may be determined. In exemplary embodiments in accordance with principles of inventive concepts, a first index satisfying the determination condition from among indexes respectively assigned to the coefficients of the first transformed data generated in operation S420 may be determined. Additionally, a second index satisfying the determination condition from among indexes respectively assigned to the coefficients of the second transformed data generated in operation S420 may be determined.

In operation S440, a value of the first index determined in operation S430 may be compared with a value of the second index determined in operation S430. When the value of the determined first index is smaller than the value of the determined second index, operation S450 may be performed. In operation S450, the first transformed data may be encoded. On the other hand, when the value of the determined first index is greater than the value of the determined second index, operation S455 may be performed. In operation S455, the second transformed data may be encoded. Additionally, when the value of the determined first index is equal to the value of the determined second index, one of the first transformed data and the second transformed data may be encoded.

Figure 14:
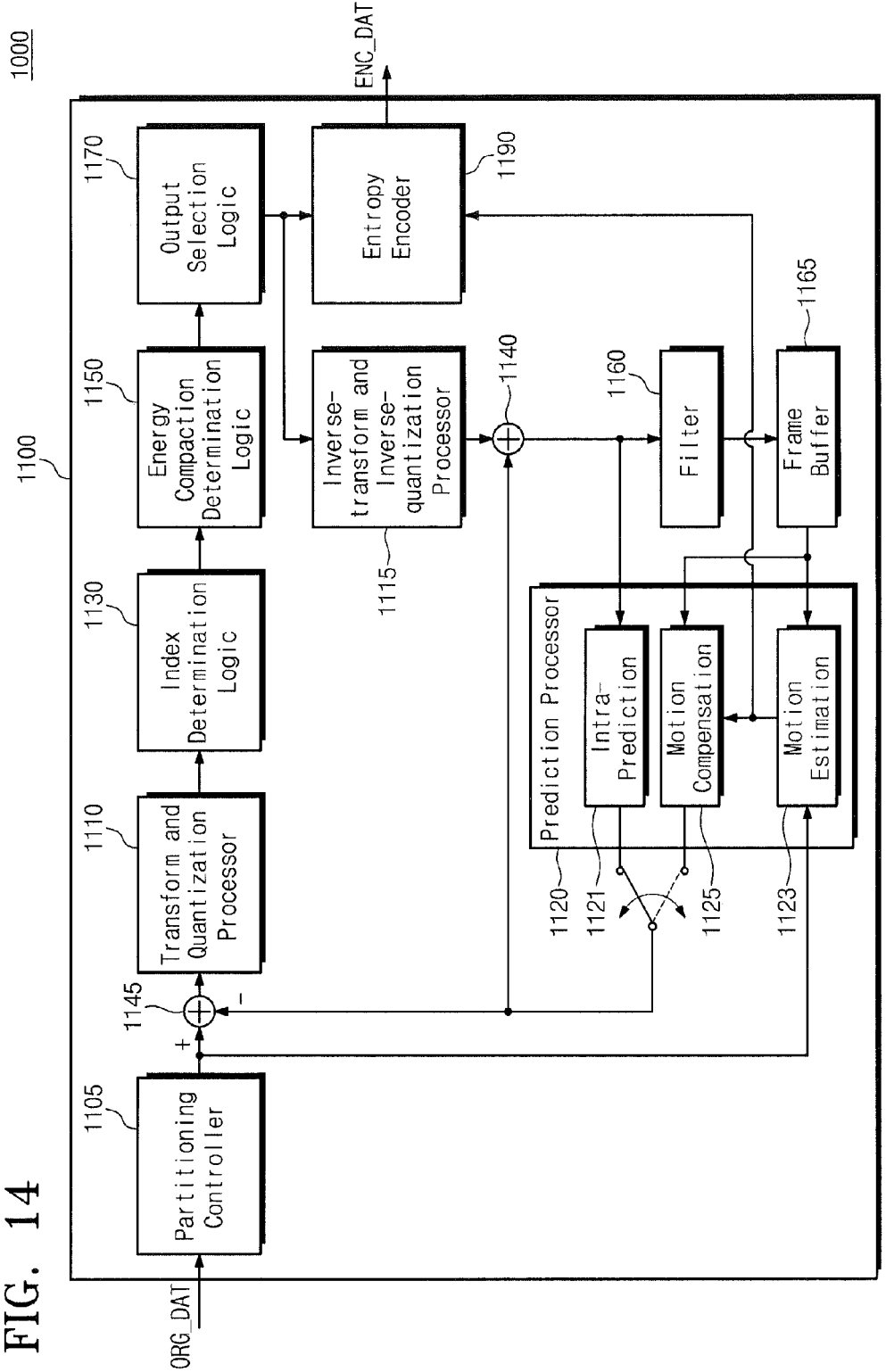
FIG. 14 is a block diagram illustrating an operation processing device including a video encoder in accordance with principles of inventive concepts.

FIG. 14 is a block diagram illustrating a device 1000 including an exemplary embodiment of a video encoder 1100 in accordance with principles of inventive concepts. Operation processing device 1000 may include a processor, such as a graphic processing unit, for example. In exemplary embodiments in accordance with principles of inventive concepts, the video encoder may operate according to a HEVC standard and may be configured according to one or more exemplary embodiments in accordance with principles of inventive concepts as described above. That is, the video encoder 1100 may include a transform and quantization processor 1110, index determination logic 1130, energy compaction determination logic 1150, output selection logic 1170, and an entropy encoder 1190, for example.

The transform and quantization processor 1110 may receive residual data that may include residual information. The residual data may form a transform unit. The transform unit is a data unit being used in an operation of the transform and quantization processor 1110. The residual data will be described in greater detail below.

The transform and quantization processor 1110 may process the residual data using at least one of a first processing method and a second processing method. In exemplary embodiments in accordance with principles of inventive concepts, the first processing method may be performed by transforming the residual data into frequency domain data and quantizing the frequency domain data and the second processing method may be performed by quantizing the residual data without transformation.

The transform and quantization processor 1110 may process the residual data to generate at least one of first transformed data and second transformed data. The first transformed data may be generated by the first processing method, and the second transformed data may be generated by the second processing method. In exemplary embodiments in accordance with principles of inventive concepts, each of the first transformed data and the second transformed data may include a coefficients. The coefficients may have an index assigned according to a scan order.

The index determination logic 1130 may determine an index satisfying a determination condition from among indexes respectively assigned to the coefficients. In particular, the index determination logic 1130 may determine the index satisfying a determination condition based on at least one of the first transformed data and the second transformed data, which are generated by the transform and quantization processor 1110.

The energy compaction determination logic 1150 may determine energy compaction of at least one of the first transformed data and the second transformed data. In particular, the energy compaction determination logic 1150 may determine energy compaction based on the index determined by the index determination logic 1130, for example.

The output selection logic 1170 may selectively output one of the first transformed data and the second transformed data. In particular, in exemplary embodiments in accordance with principles of inventive concepts, the output selection logic 1170 may select data to be output based on energy compaction, as determined by the energy compaction determination logic 1150.

The entropy encoder 1190 may encode data output from the output selection logic 1170 to generate encoded data ENC_DAT.

Configurations and functions of the transform and quantization processor 1110, the index determination logic 1130, the energy compaction determination logic 1150, the output selection logic 1170, and the entropy encoder 1190 of FIG. 14 may include configurations and functions of a transform processor 110, index determination logic 130, energy compaction determination logic 150, output selection logic 170, and an entropy encoder 190 as described in discussions related to FIGS. 1 to 8, for example. Redundant descriptions associated with the transform and quantization processor 1110, the index determination logic 1130, the energy compaction determination logic 1150, the output selection logic 1170, and the entropy encoder 1190 will not be repeated here.

In an exemplary embodiment, the video encoder 1100 may include a partitioning controller 1105, an inverse-transform and inverse-quantization processor 1115, a prediction processor 1120 and summers 1140 and 1145.

The partitioning controller 1105 may receive the original data ORG_DAT. The partitioning controller 1105 may partition the original data ORG_DAT to generate data of transform unit. In an exemplary embodiment, the transform unit may be formed by the residual information corresponding to pixels of a size 4×4, 16×16 or 32×32, for example.

Additionally, the partitioning controller 1105 may partition the original data ORG_DAT to generate data of prediction unit. The prediction unit is a data unit being used in an operation of the prediction processor 1120.

The inverse-transform and inverse-quantization processor 1115 may process data output from the output selection logic 1170. In particular, the inverse-transform and inverse-quantization processor 1115 may use an inverse processing method corresponding to a processing method used to generate data output from the output selection logic 1170 from among the first processing method and the second processing method. For example, when the output selection logic 1170 outputs the first transformed data, the inverse-transform and inverse-quantization processor 1115 may inversely quantize the first transformed data and inversely transform the inverse-quantized data. Alternatively, when the output selection logic 1170 outputs the second transformed data, the inverse-transform and inverse-quantization processor 1115 may inversely quantize the second transformed data without an inverse-transformation. Accordingly, the inverse-transform and inverse-quantization processor 1115 may restore the residual data.

The prediction processor 1120 may perform a prediction operation to predict variation of the original data ORG_DAT. The prediction processor 1120 may perform the prediction operation based on the residual data restored by the inverse-transform and inverse-quantization processor 1115 and the data of the prediction unit. Accordingly, the prediction processor 1120 may generate prediction data.

In exemplary embodiments in accordance with principles of inventive concepts prediction processor 1120 may include an intra-predictor 1121, a motion estimator 1123 and a motion compensator 1125. The intra-predictor 1121 may obtain the prediction data associated with a prediction target block of a current frame of the original data ORG_DAT by using a block adjacent to the prediction target block. That is, an intra-prediction may be performed based on blocks included in one frame.

The motion estimator 1123 may compare a current frame with a previous frame to perform an inter-prediction. The motion estimator 1123 may detect a block of the previous frame, which is most similar to a prediction target block of the current frame. The motion estimator 1123 may generate a motion vector representing a location relation between the prediction target block of the current frame and the detected block of the previous frame. The motion compensator 1125 may obtain prediction data detected by an inter-prediction. One of the prediction data obtained by the intra-prediction and the prediction data obtained by the inter-prediction may be selectively provided to the summer 1145. The motion vector generated by the motion estimator 1123 may be provided to the entropy encoder 1190. In exemplary embodiments in accordance with principles of inventive concepts motion vector may be employed to generate the encoded data ENC_DAT.

The summer 1140 may add the residual data restored by the inverse-transform and inverse-quantization processor 1115 to the prediction data generated by the prediction processor 1120. In this manner, the summer 1140 may provide data corresponding to the original data ORG_DAT to the prediction processor 1120. The summer 1145 may generate the residual data based on the prediction data generated by the prediction processor 1120 and the data of transform unit. In particular, the residual data may be generated as a difference between the data of the transform unit and the prediction data. Accordingly, the summer 1145 may provide the residual data to the transform and quantization processor 1110.

In exemplary embodiments in accordance with principles of inventive concepts, the video encoder 1100 may include a filter 1160 and a frame buffer 1165. Filter 1160 may include a deblocking filter for removing a noise included in a boundary between blocks, a sample adaptive offset filter for compensating distortion between a frame of the original data ORG_DAT and a frame of the restored data, an adaptive loop filter for compensating information loss occurred during an encoding in a high efficiency (HE) mode, for example.

The frame buffer 1165 may buffer information of a previous frame of the original data ORG_DAT. The information buffered by the frame buffer 1165 may be provided to the motion estimator 1123 and the motion compensator 1125. The information buffered by the frame buffer 1165 may be used together with information of a current frame to perform an inter-prediction in exemplary embodiments in accordance with principles of inventive concepts.

Figure 15:
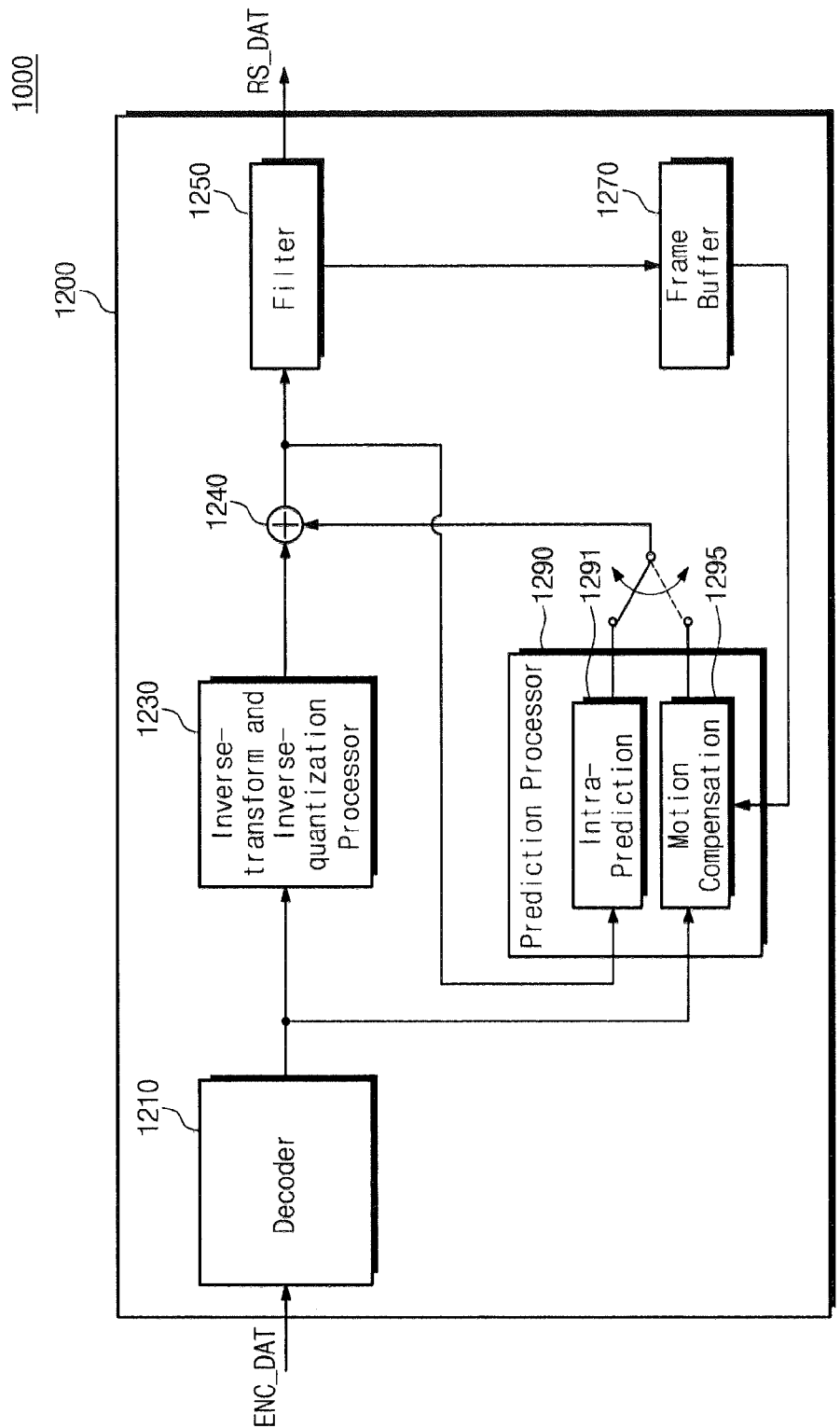
FIG. 15 is a block diagram illustrating a video decoder corresponding to a video encoder in accordance with principles of inventive concepts.

FIG. 15 is a block diagram illustrating a video decoder 1200 corresponding to an exemplary embodiment of a video encoder 1100 (refer to FIG. 14) in accordance with principles of inventive concepts. In exemplary embodiments the video decoder 1200 may operate according to a HEVC standard. The video decoder 1200 may include a decoder 1210, an inverse-transform and inverse-quantization processor 1230, a summer 1240, a filter 1250, a frame buffer 1270 and a prediction processor 1290.

The decoder 1210 may receive encoded data ENC_DAT. The decoder 1210 may decode the encoded data ENC_DAT.

The inverse-transform and inverse-quantization processor 1230 may process data decoded by the decoder 1210. In particular, the inverse-transform and inverse-quantization processor 1230 may refer to a flag value included in the encoded data ENC_DAT. The inverse-transform and inverse-quantization processor 1230 may restore residual data by using an inverse processing method corresponding to one of a first processing method and a second processing method depending upon the flag value, for example.

The summer 1240 may add the residual data restored by the inverse-transform and inverse-quantization processor 1230 to prediction data generated by the prediction processor 1290. The summer 1240 may provide data corresponding to an operation result to the filter 1250 and the prediction processor 1290.

Configurations and functions of the filter 1250 and the frame buffer 1270 may be similar to those of a filter 1160 and a frame buffer 1165 of FIG. 14, respectively, for example. Configurations and functions of an intra-predictor 1291 and a motion compensator 1295 included in the prediction processor 1290 may be similar to those of an intra-predictor 1121 and a motion compensator 1125 of FIG. 14. Redundant descriptions associated with the filter 1250, the frame buffer 1270 and the prediction processor 1290 will not be repeated here.

The filter 1250 may output restored data RS_DAT and an image may be displayed based on the restored data RS_DAT. The operation processing device 1000 may provide the restored data RS_DAT and a control signal to a display device. In this manner, a user may see a displayed image.

Figure 16:
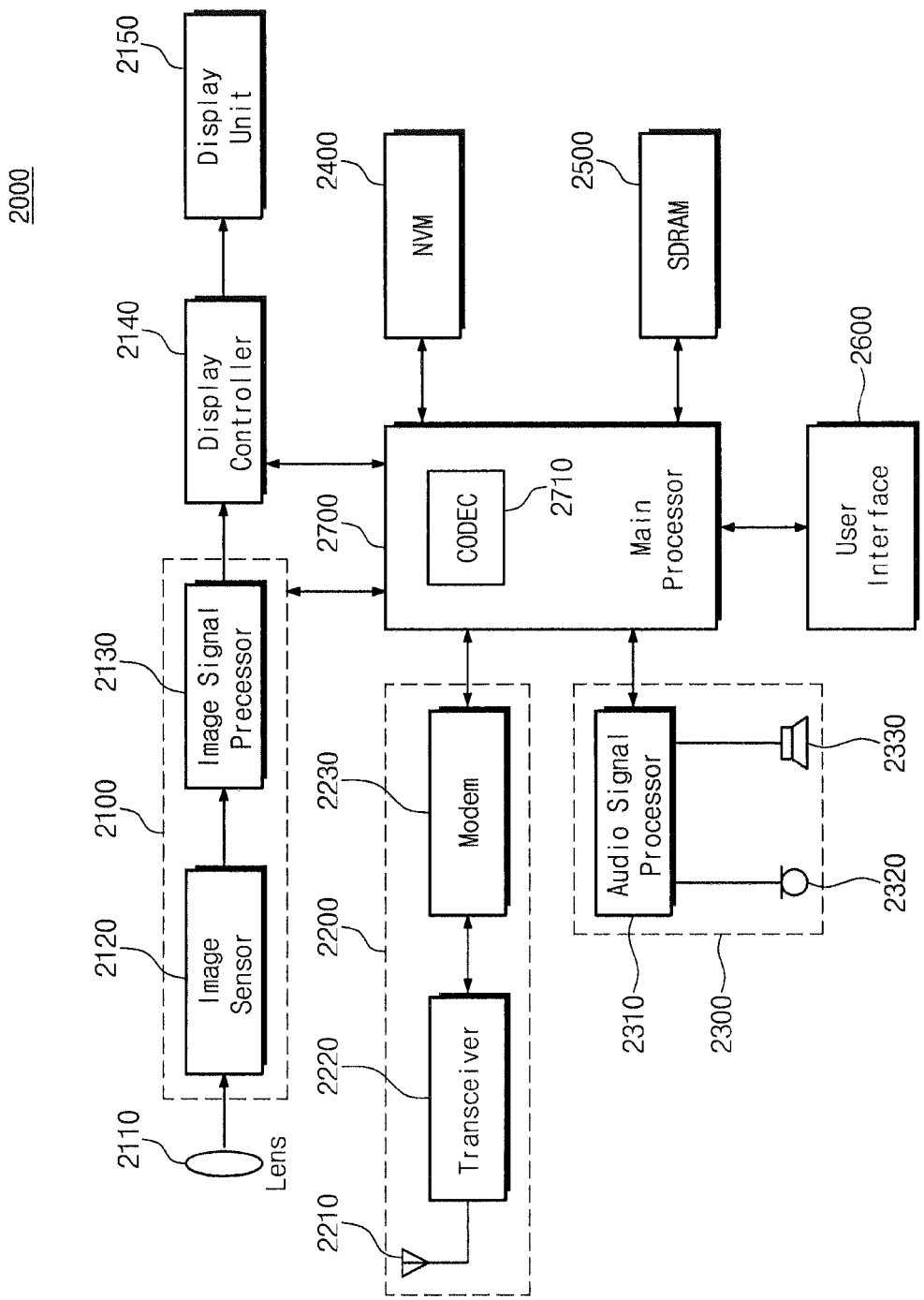
FIG. 16 is a block diagram illustrating a portable device including a video codec in accordance with principles of inventive concepts.

FIG. 16 is a block diagram illustrating a portable electronic device 2000 including a video codec 2710 in accordance with an exemplary embodiment in accordance with principles of inventive concepts. The portable device 2000 may be one of a mobile terminal, a personal digital assistant (PDA), a personal media player (PMP), a smart phone, or a tablet computer, for example. The portable electronic device 2000 may include an image processor 2100, a wireless communication block 2200, an audio processor 2300, a nonvolatile memory 2400, a synchronous dynamic random access memory (SDRAM) 2500, a user interface 2600, and a main processor 2700.

The image processor 2100 may receive light through a lens 2110. An image sensor 2120 and an image signal processor 2130 included in the image processor 2100 may generate image data by using the received light. The generated image may be displayed on a display unit 2150 under control of a display controller 2140. In exemplary embodiments in accordance with principles of inventive concepts, the display unit 2150 may be one of a liquid crystal display (LCD), a light emitting diode (LED), an organic LED (OLED) display, or an active matrix OLED (AMOLED) display, for example.

The wireless communication block 2200 may include an antenna 2210, a transceiver 2220 and a modem 2230. The wireless communication block 2200 may communicate with the outside of the portable device 2000 according to one or more of various wireless communication protocols, such as a long term evolution (LTE), a world interoperability for microwave access (WiMax), a global system for mobile communication (GSM), a code division multiple access (CDMA), Bluetooth, a near field communication (NFC), a wireless fidelity (WiFi), a radio frequency identification (RFID), and so on.

The audio processor 2300 may process an audio signal using an audio signal processor 2310, a microphone 2320, and a speaker 2330. The nonvolatile memory 2400 may store data. As an example embodiment, the nonvolatile memory 2400 may be a NAND-type flash memory, a phase-change RAM (PRAM), a magneto-resistive RAM (MRAM), a resistive RAM (ReRAM), a ferro-electric RAM (FRAM), a NOR-type flash memory, and so on. Alternatively, the nonvolatile memory 2400 may include different types of memories. The SDRAM 2500 may temporarily store data being used in operation of the portable device 2000. The SDRAM 2500 may be used as an operation memory, a buffer memory, or a working memory of the portable device 2000.

The user interface 2600 may relay a communication between a user and the portable device 2000 according to a control of the main processor 2700. For instance, the user interface 2600 may include an input interface, such as a keyboard, a keypad, a button, a touch panel, a touch screen, a touch pad, a touch ball, a camera, a microphone, a gyroscope sensor, or a vibration sensor, for example. The user interface 2600 may include an output interface, such as a display device, a motor, or a speaker, for example.

The main processor 2700 may control the overall operations of the portable device 2000. The image processor 2100, the wireless communication block 2200, the audio processor 2300, the nonvolatile memory 2400, and the SDRAM 2500 may perform operations associated with a user command being provided through the user interface 2600 according to a control of the main processor 2700. Alternatively, the image processor 2100, the wireless communication block 2200, the audio processor 2300, the nonvolatile memory 2400, and the SDRAM 2500 may provide information to a user through user interface 2600 under control of the main processor 2700.

The main processor 2700 may be implemented by a system on chip (SoC). In exemplary embodiments in accordance with principles of inventive concepts, the main processor 2700 may include an application processor. The main processor 2700 may include a video codec 2710 for encoding or decoding video information. The video codec 2710 may be implemented by a hardware, a software, or a hybrid form.

The main processor 2700 and the video codec 2710 may be configured based on one or more example embodiments of the present disclosure described with reference to FIGS. 1 to 15. The main processor 2700 may select one of two (or more) different processing methods used in transformation of image data, based on indexes respectively assigned to a coefficients used to display image data. According to the portable device 2000 of FIG. 16, one or more example embodiments of the present disclosure may be performed by the main processor 2700.

Figure 17:
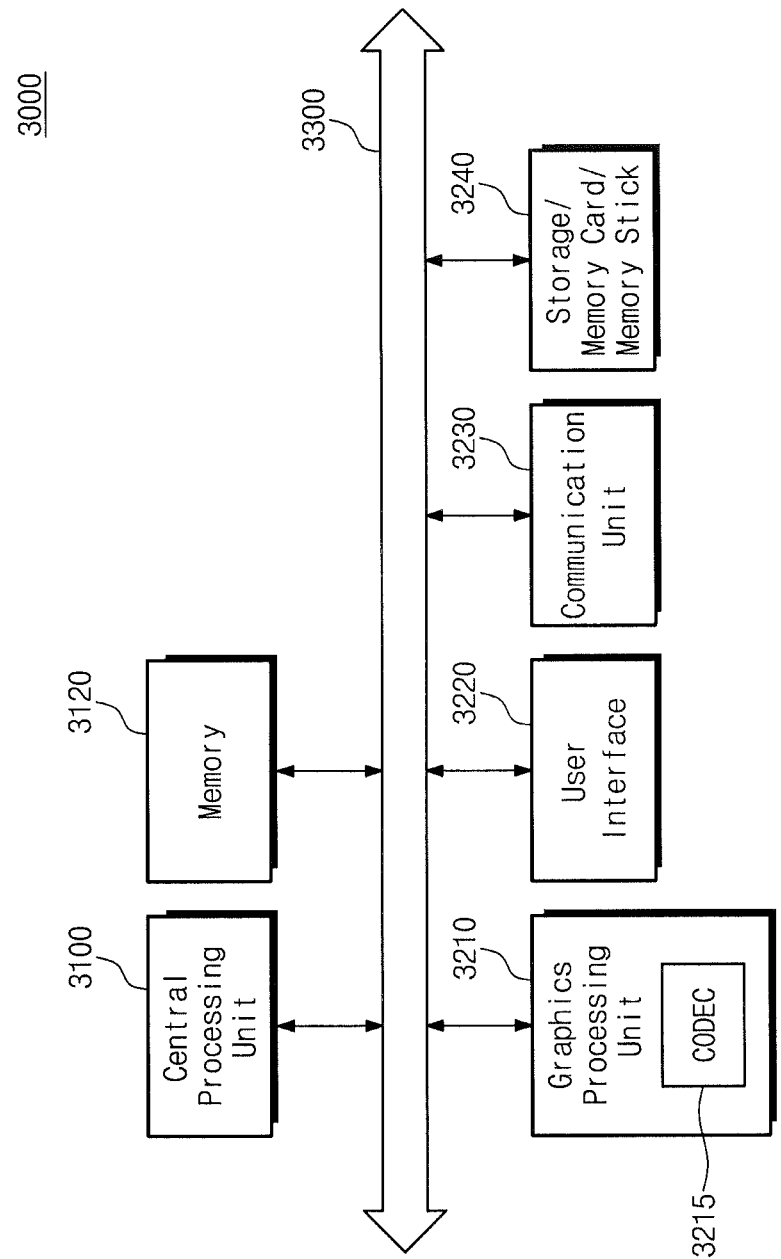
FIG. 17 is a block diagram illustrating a computing device including a video codec in accordance with principles of inventive concepts.

FIG. 17 is a block diagram illustrating a computing device 3000 including a video codec 3215 in accordance with principles of inventive concepts. The computing device 3000 may include a central processing unit 3100, a memory 3120, a graphic processing unit 3210, a user interface 3220, a communication unit 3230, a storage unit 3240, and a bus 3300.

The central processing unit 3100 may control the overall operations of the computing system 3000. The central processing unit 3100 may perform various kinds of operations. In exemplary embodiments in accordance with principles of inventive concepts, the central processing unit 3100 may include a general purpose processor or a special purpose processor, for example.

The memory 3120 may temporarily store data used in operation of the computing device 3000. The memory 3120 may exchange data with the central processing unit 3100. The memory 3120 may be used as a main memory, an operation memory, a buffer memory, or a working memory of the computing device 3000. In exemplary embodiments in accordance with principles of inventive concepts, the memory 3120 may include a volatile memory such as a static RAM (SRAM), a DRAM, a SDRAM, and so on, and/or a nonvolatile memory such as a flash memory, a PRAM, a MRAM, a ReRAM, a FRAM, and so on. The memory 3120 may include one or more memory modules, or one or more memory packages.

The graphic processing unit 3210 may perform the overall operation related to an image processing. The graphic processing unit 3210 may include a video codec 3215 in accordance with principles of inventive concepts for encoding or decoding video information. The video codec 3215 may be implemented by hardware, software, or a combination thereof.

The graphic processing unit 3210 and the video codec 3215 may be configured based on one or more exemplary embodiments in accordance with principles of inventive concepts described with reference to FIGS. 1 to 15. The graphic processing unit 3210 may select one of two (or more) different processing methods being used in transformation of image data, based on indexes respectively assigned to a coefficients used to display image data. Unlike the portable device 2000 of FIG. 16, according to the computing device 3000 of FIG. 17, one or more example embodiments of the present disclosure may be performed by the graphic processing unit 3210 separately provided from the central processing unit 3100.

The user interface 3220 may relay communications between a user and the computing device 3000 under control of the central processing unit 3100. In exemplary embodiments in accordance with principles of inventive concepts, the user interface 3220 may include an input interface, such as a keyboard, a keypad, a button, a touch panel, a touch screen, a touch pad, a touch ball, a camera, a microphone, a gyroscope sensor, or a vibration sensor, for example. The user interface 3220 may include an output interface, such as a LCD, a LED, an OLED display device, an AMOLED display device, a speaker, or a motor, for example.

The communication unit 3230 may communicate with the outside of the computing device 3000 under control of the central processing unit 3100. The communication unit 3230 may communicate with the outside of the computing device 3000 using one or more of wired and/or wireless communication protocols. The communication unit 3230 may communicate with the outside of the computing device 3000 using at least one of various wireless communication protocols such as LTE, WiMax, GSM, CDMA, Bluetooth, NFC, WiFi, RFID, and so on, and/or various wired communication protocols such as universal serial bus (USB), small computer system interface (SCSI), peripheral component interconnect express (PCIe), advanced technology attachment (ATA), parallel ATA (PATA), serial ATA (SATA), serial attached SCSI (SAS), integrated drive electronics (IDE), firmware, universal flash storage, and so on.

The storage unit 3240 may store data. In exemplary embodiments in accordance with principles of inventive concepts, the storage unit 3240 may include a nonvolatile memory such as a flash memory, a PRAM, a MRAM, a ReRAM, or a FRAM, for example. In exemplary embodiments in accordance with principles of inventive concepts, the storage unit 3240 may include at least one of a storage device like a solid state drive (SSD), and a memory card such as an embedded multimedia card (eMMC) or an UFS memory card.

The bus 3300 may provide a communication route between components of the computing device 3000. The components of the computing device 3000 may exchange data with one another according to a bus format, such as USB, SCSI, PCIe, ATA, PATA, SATA, SAS, IDE, or UFS, for example.

The processors, memories, and circuits in accordance with exemplary embodiments in accordance with principles of inventive concepts may be mounted using various types of semiconductor packages. For example, the video encoding circuit and the operation processing device according to example embodiments of the present disclosure may be mounted using a packaging technique, such as package on package (PoP), ball grid array (BGA), chip scale packages (CSPs), plastic leaded chip carrier (PLCC), plastic dual in-line package (PDIP), die in waffle pack, die in wafer form, chip on board (COB), ceramic dual in-line package (CERDIP), metric quad flat pack (MQFP), thin quad flat pack (TQFP), small outline integrated circuit (SOIC), shrink small outline package (SSOP), thin small outline package (TSOP), system in package (SIP), multi chip package (MCP), wafer-level fabricated package (WPP), wafer-level processed stack package (WSP), and so on.

The above-disclosed subject matter is to be considered illustrative, and not restrictive, and the appended claims are intended to cover modifications, enhancements, and other embodiments that fall within the spirit and scope of inventive concepts. Thus, to the maximum extent allowed by law, the scope of inventive concepts is to be determined by the broadest permissible interpretation of the following claims and their equivalents, and shall not be restricted or limited by the foregoing detailed description.

What is claimed is:

1. A video encoding circuit comprising:
a transform processor configured to:
receive original data comprising video information,
process the received original data by using at least one of first and second processing methods, and
generate at least one of first and second transformed data corresponding to the first and second processing methods, each of the first and second transformed data comprising coefficients indicative of energy, the coefficients having indexes respectively assigned according to a scan order;
index determination logic configured to determine an index satisfying a determination condition from among the indexes respectively assigned to the coefficients, based on at least one of the first transformed data generated by the first processing method and the second transformed data generated by the second processing method, wherein the determination condition is based on the energy of the coefficients;
energy compaction determination logic configured to determine energy compaction of at least one of the first and second transformed data, based on the determined index;
output selection logic configured to selectively output one of the first and second transformed data, based on the determined energy compaction; and
an entropy encoder configured to encode data output from the output selection logic to generate encoded data.

2. The video encoding circuit of claim 1, wherein the first processing method transforms the received original data into frequency domain data and quantizes the frequency domain data to produce the first transformed data, and
wherein the second processing method quantizes the received original data to produce the second transformed data.

3. The video encoding circuit of claim 1, wherein the index satisfying the determination condition is an index having a greatest value from among indexes respectively assigned to one or more coefficients having energy included in the coefficients of at least one of the first and second transformed data.

4. The video encoding circuit of claim 1, wherein the transform processor is configured to generate the first transformed data using the first processing method,
wherein the index determination logic is configured to determine the index satisfying the determination condition from among the indexes respectively assigned to the coefficients of the first transformed data, and
wherein the energy compaction determination logic is configured to compare a value of the determined index with a reference value.

5. The video encoding circuit of claim 4, wherein when the value of the determined index is equal to or smaller than the reference value, the output selection logic is configured to output the first transformed data, and
wherein when the value of the determined index is greater than the reference value:
the transform processor is configured to generate the second transformed data using the second processing method, and
the output selection logic is configured to output the second transformed data.

6. The video encoding circuit of claim 4, wherein the reference value has a different value depending on a type of an image formed based on the video information.

7. The video encoding circuit of claim 6, further comprising:
image determination logic configured to determine the type of the image formed based on the video information;
a register configured to store a plurality of reference values respectively corresponding to different image types; and
reference value selection logic configured to:
select one of the plurality of reference values, according to a determination result of the image determination logic, and
provide the selected reference value to the energy compaction determination logic.

8. The video encoding circuit of claim 1, wherein the transform processor is configured to generate the first and second transformed data by respectively using the first and second processing methods,
wherein the index determination logic is configured to determine the index satisfying the determination condition from among the indexes respectively assigned to the coefficients of the first transformed data, and
wherein the energy compaction determination logic is configured to compare a value of the determined index with a reference value.

9. The video encoding circuit of claim 8, wherein when the value of the determined index is equal to or smaller than the reference value, the output selection logic is configured to output the first transformed data, and
wherein when the value of the determined index is greater than the reference value, the output selection logic is configured to output the second transformed data.

10. The video encoding circuit of claim 1, wherein the transform processor is configured to generate the first and second transformed data by respectively using the first and second processing methods,
wherein the index determination logic is configured to determine a first index satisfying the determination condition from among the indexes respectively assigned to the coefficients of the first transformed data and a second index satisfying the determination condition from among the indexes respectively assigned to the coefficients of the second transformed data, and
wherein the energy compaction determination logic is configured to compare a value of the determined first index with a value of the determined second index.

11. The video encoding circuit of claim 10, wherein when the value of the determined first index is smaller than the value of the determined second index, the output selection logic is configured to output the first transformed data,
wherein when the value of the determined first index is greater than the value of the determined second index, the output selection logic is configured to output the second transformed data, and
wherein when the value of the determined first index is equal to the value of the determined second index, the output selection logic is configured to output one of the first and second transformed data.

12. A video encoding method using a video encoding circuit, the video encoding method comprising:
receiving original data comprising video information;
generating at least one of first and second transformed data corresponding to first and second processing methods by processing the received original data with at least one of the first and second processing methods, each of the first and second transformed data comprising coefficients indicative of energy, the coefficients having indexes respectively assigned according to a scan order;

determining an index satisfying a determination condition from among the indexes respectively assigned to the coefficients, based on at least one of the first transformed data generated by the first processing method and the second transformed data generated by the second processing method;

determining energy compaction of at least one of the first and second transformed data, based on the determined index; and selectively encoding one of the first and second transformed data, based on the determined energy compaction.

13. The video encoding method of claim 12, wherein generating at least one of the first and second transformed data comprises generating the first transformed data by using the first processing method, wherein determining the index comprises determining the index satisfying the determination condition from among the indexes respectively assigned to the coefficients of the first transformed data, wherein determining the energy compaction comprises comparing a value of the determined index with a reference value, wherein when the value of the determined index is equal to or smaller than the reference value, selectively encoding comprises encoding the first transformed data, and wherein when the value of the determined index is greater than the reference value, selectively encoding comprises:
further generating the second transformed data by using the second processing method, and
encoding the second transformed data.

14. The video encoding method of claim 12, wherein generating at least one of the first and second transformed data comprises generating the first and second transformed data by respectively using the first and second processing methods, wherein determining the index comprises determining the index satisfying the determination condition from among the indexes respectively assigned to the coefficients of the first transformed data, wherein determining the energy compaction comprises comparing a value of the determined index with a reference value, wherein when the value of the determined index is equal to or smaller than the reference value, selectively encoding comprises encoding the first transformed data, and wherein when the value of the determined index is greater than the reference value, selectively encoding comprises encoding the second transformed data.

15. The video encoding method of claim 12, wherein generating at least one of the first and second transformed data comprises generating the first and second transformed data by respectively using the first and second processing methods, wherein determining the index comprises determining a first index satisfying the determination condition from among the indexes respectively assigned to the coefficients of the first transformed data and a second index satisfying the determination condition from among the indexes respectively assigned to the coefficients of the second transformed data, wherein determining the energy compaction comprises comparing a value of the determined first index with a value of the determined second index, wherein when the value of the determined first index is smaller than the value of the determined second index, selectively encoding comprises encoding the first transformed data, wherein when the value of the determined first index is greater than the value of the determined second index, selectively encoding comprises encoding the second transformed data, and wherein when the value of the determined first index is equal to the value of the determined second index, selectively encoding comprises encoding one of the first and second transformed data.

16. An electronic device comprising a video encoder, wherein the video encoder comprises:
a transform and quantization processor configured to:
receive residual data included in transform unit and comprising residual information,
process the received residual data by using at least one of first and second processing methods, and
generate at least one of first and second transformed data corresponding to the first and second processing methods, each of the first and second transformed data comprising coefficients indicative of energy, the coefficients having indexes respectively assigned according to a scan order;
index determination logic configured to determine an index satisfying a determination condition from among the indexes respectively assigned to the coefficients, based on the first transformed data generated by the first processing method and the second transformed data generated by the second processing method;
energy compaction determination logic configured to determine energy compaction of at least one of the first and second transformed data, based on the determined index;
output selection logic configured to selectively output one of the first and second transformed data, based on the determined energy compaction; and
an entropy encoder configured to encode data output from the output selection logic to generate encoded data.

17. The electronic device of claim 16, wherein the video encoder further comprises:
a partitioning controller configured to partition original data to generate data of the transform unit and data of prediction unit;
an inverse-transform and inverse-quantization processor configured to process the data output from the output selection logic by using an inverse processing method to restore the residual data, the inverse processing method corresponding to a processing method used to generate the data output from the output selection logic from among the first and second processing methods; and
a prediction processor configured to perform a prediction operation based on the data of the prediction unit and the restored residual data to generate prediction data, the prediction operation being performed to predict variation of the original data.

18. The electronic device of claim 17, wherein the residual data is calculated based on the data of the transform unit and the prediction data.

19. The electronic device of claim 16, wherein the video encoder is configured to operate according to a H.265/HEVC standard.

20. The electronic device of claim 16, further comprising an application processor.

\* \* \* \* \*